United States Patent
Fujita et al.

(10) Patent No.: US 9,053,407 B2
(45) Date of Patent: Jun. 9, 2015

(54) IMAGE PROCESSING APPARATUS AND IMAGE PROCESSING METHOD

(75) Inventors: Takashi Fujita, Kawasaki (JP);
Fumihiro Goto, Kawasaki (JP);
Shigeyasu Nagoshi, Yokohama (JP);
Akihiko Nakatani, Kawasaki (JP);
Okinori Tsuchiya, Yokohama (JP);
Ayumi Sano, Kawasaki (JP); Tomokazu Ishikawa, Kawasaki (JP); Akitoshi Yamada, Yokohama (JP); Mitsuhiro Ono, Tokyo (JP); Fumitaka Goto, Tokyo (JP); Rie Kajihara, Minoh (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/966,135

(22) Filed: Dec. 13, 2010

(65) Prior Publication Data

US 2011/0149305 A1 Jun. 23, 2011

(30) Foreign Application Priority Data

Dec. 18, 2009 (JP) ................................. 2009-287538

(51) Int. Cl.
*G06K 15/02* (2006.01)
*G06K 15/10* (2006.01)

(52) U.S. Cl.
CPC ................................. *G06K 15/107* (2013.01)

(58) Field of Classification Search
CPC ............................. G06K 15/107; H04N 1/405
USPC .......................................................... 358/1.5
See application file for complete search history.

(56) References Cited

U.S. PATENT DOCUMENTS

| | | | |
|---|---|---|---|
| 6,206,502 B1 * | 3/2001 | Kato et al. ...................... | 347/41 |
| 6,511,143 B1 | 1/2003 | Ishikawa et al. | |
| 6,511,146 B2 * | 1/2003 | Ishikawa et al. ................ | 347/15 |
| 7,213,899 B2 * | 5/2007 | Ho ................... | 347/15 |
| 2005/0280668 A1 * | 12/2005 | Otsuki .......................... | 347/43 |
| 2006/0044574 A1 * | 3/2006 | Ide et al. ........................ | 358/1.8 |
| 2007/0216724 A1 * | 9/2007 | Shibata et al. .................. | 347/41 |
| 2009/0161131 A1 * | 6/2009 | Fujimoto et al. ............... | 358/1.9 |
| 2011/0141176 A1 * | 6/2011 | Goto et al. ...................... | 347/14 |
| 2012/0062636 A1 * | 3/2012 | Yamamoto et al. ............. | 347/15 |

FOREIGN PATENT DOCUMENTS

JP 2000-103088 A 4/2000

\* cited by examiner

*Primary Examiner* — King Poon
*Assistant Examiner* — Ted Barnes
(74) *Attorney, Agent, or Firm* — Fitzpatrick, Cella, Harper & Scinto

(57) ABSTRACT

In image processing, it is possible to suppress density fluctuation and keep graininess low as well as obtain a good balance of the processing load. More specifically, when dividing multi-valued data and generating two-pass multi-pass printing data, divided multi-valued data that is common to the two passes is generated in addition to the divided multi-valued data for each of the two passes. Moreover, quantized data of that common multi-valued data is reflected on the quantized data for each pass. Furthermore, when generating quantized data, a process of generating common data by the aforementioned data division, or a process of performing quantization first without dividing the multi-valued data and then dividing the quantized 2-pass data is selectively performed according to the printing position on printing medium.

10 Claims, 15 Drawing Sheets

MAIN SCANNING DIRECTION

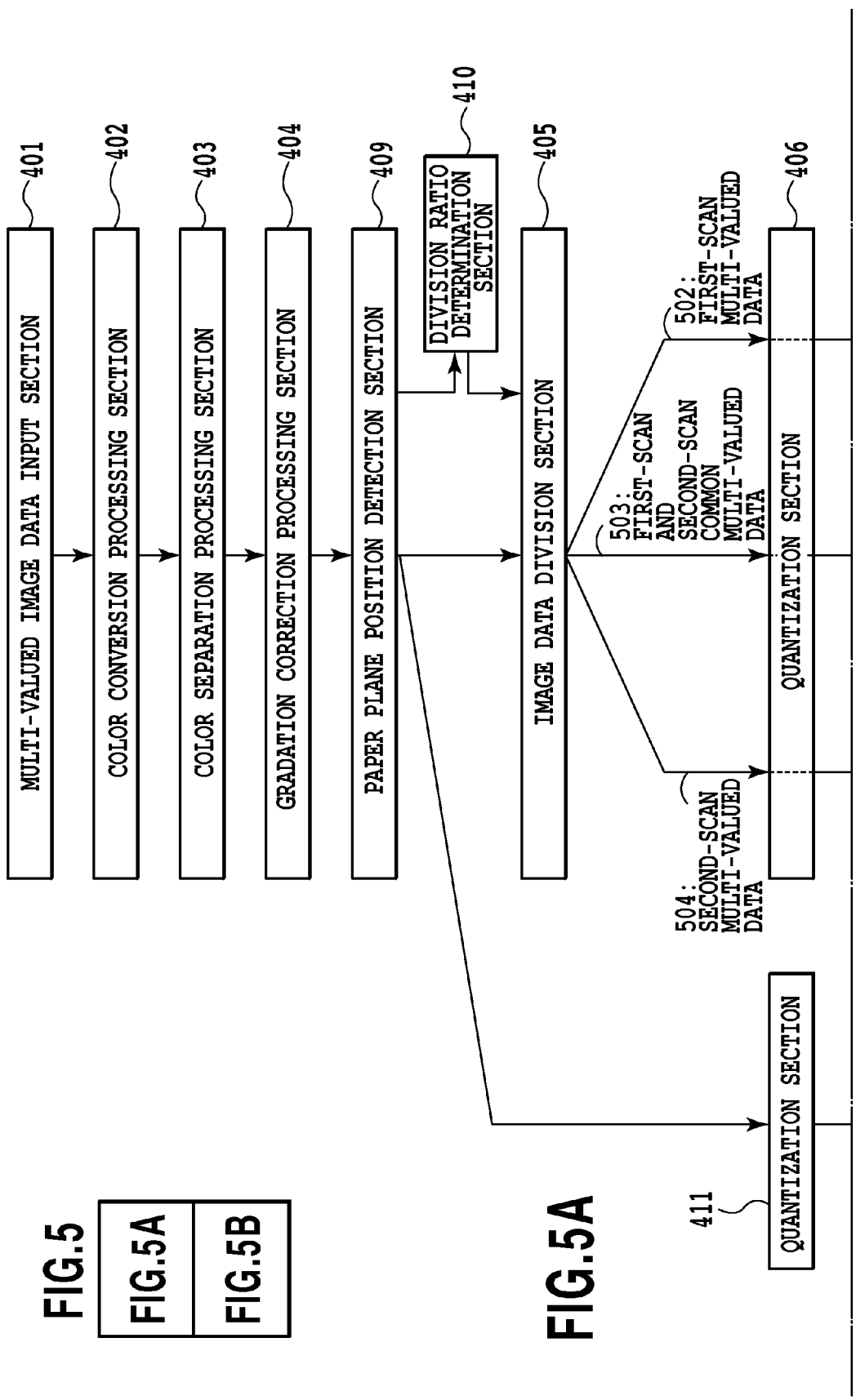

| | ● | 7 |
|---|---|---|
| 1 | 3 | 5 |

● THE DOT DENOTES THE OBJECT PIXEL

FIG.7A

| | ● | 9 | 3 |
|---|---|---|---|
| 5 | 9 | 3 | |
| | 3 | | |

● THE DOT DENOTES THE OBJECT PIXEL

FIG.7B

| | | ● | 2 | 1 |
|---|---|---|---|---|
| 1 | 1 | 2 | 1 | |

● THE DOT DENOTES THE OBJECT PIXEL

FIG.7C

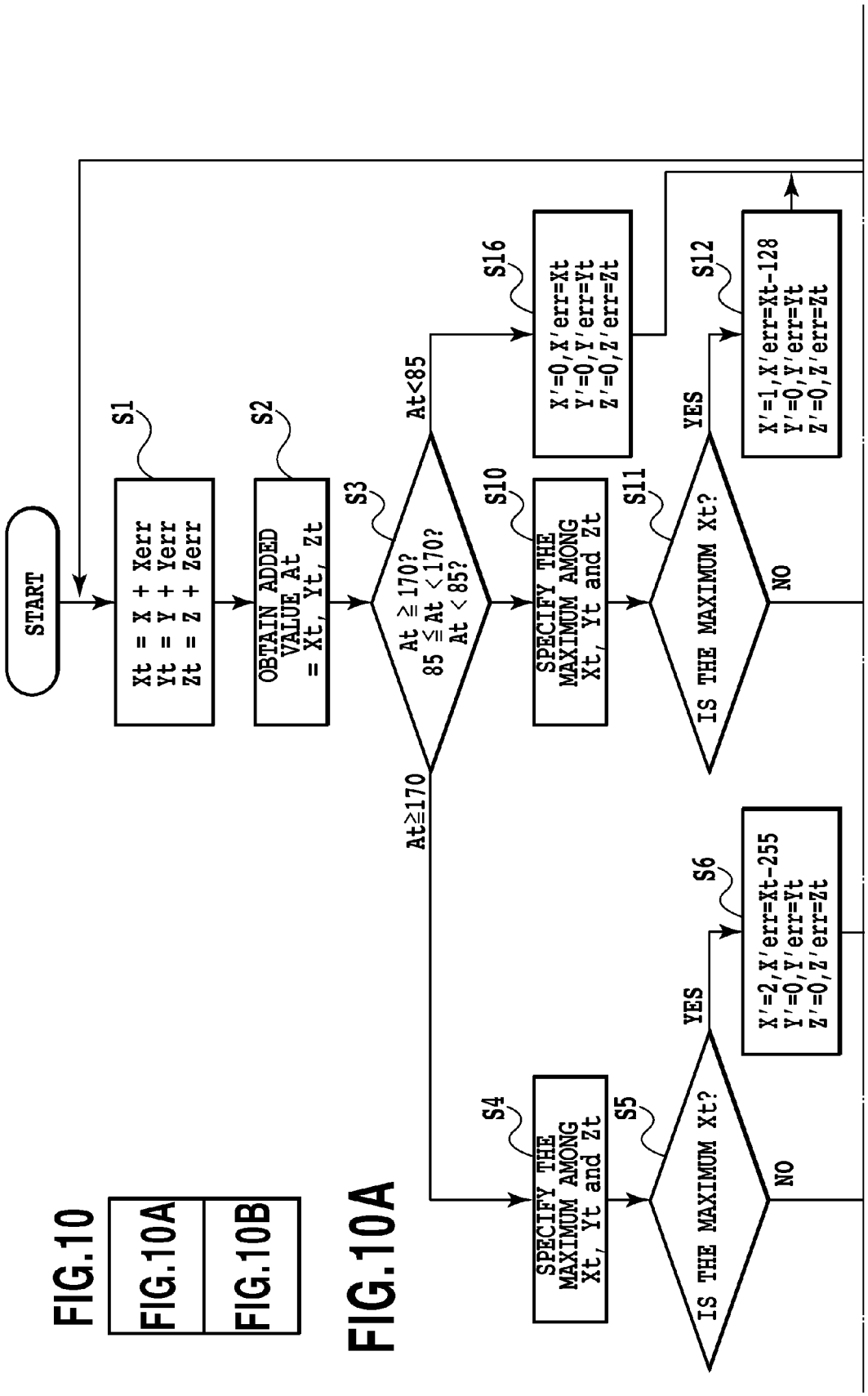

IMAGE PROCESSING APPARATUS AND IMAGE PROCESSING METHOD

BACKGROUND OF THE INVENTION

1. Field of the Invention

The present invention relates to an image processing apparatus and image processing method, and more particularly to a technique for generating data for completing printing in the same area of a printing medium by moving a printing head a plurality of times relative to the same area of the printing medium.

2. Description of the Related Art

As this kind of technique, a multi-pass printing method is known for completing an image to be printed in the same area of a printing medium by scanning that same area of the printing medium a plurality of times with a printing head. With this technique, it is possible to reduce density unevenness and stripes in an image. However, even though the multi-pass printing method is employed, there is a possibility that a shift of the dot printing position will occur between the plurality printing scans due to fluctuation in the conveyance amount of the printing medium. Such shift causes fluctuation in the dot coverage, and as a result, image defects such as density fluctuation or density unevenness may occur.

A method is known as a technique for reducing the image defects caused by the shift of the dot printing position due to the above described fluctuation of the conveyance amount in which image data are divided into respective data corresponding to different scans in the stage of multi-valued image data before binarization, and then the respective divided multi-valued image data are independently binarized (Japanese Patent Laid-Open No. 2000-103088). FIG. 13A is a diagram illustrating the arrangement of dots that are printed based on image data that are processed by the method disclosed in Japanese Patent Laid-Open No. 2000-103088. In the figure, the black dots 551 are dots that are printed in a first printing scan, white dots 552 are dots that are printed in a second printing scan and gray dots 553 are dots that are printed by overlapping of dots that are printed in the first printing scan and second printing scan.

With this dot arrangement, even though a dot group printed in a first printing scan and a dot group printed in a second printing scan become shifted in the main scanning direction or sub scanning direction, there is not much fluctuation in the dot coverage on the printing medium, and as a result, it is possible to reduce the image defects mentioned above. This is because even though portions, where dots that are printed in the first printing scan and dots that are printed in the second printing scan overlap, newly appear, there are portions where two dots that were originally supposed to be printed such that they overlap do not overlap. More specifically, conventionally, by using a mask on normally quantized data, print data are divided, as well as complementarity and exclusivity is given to data that are to be printed in different printing scans. On the other hand, the method disclosed in Japanese Patent Laid-Open No. 2000-103088 is a method in which multi-valued data are divided in the multi-valued data stage into a plurality of multi-valued data that correspond to different printing scans, and the plurality of multi-valued data are each independently quantized so that quantized data to be used in the respective printing scans are obtained. This allows complementarity between dots that are printed in different printing scans to be decreased, and overlapping dots are caused to occur among the dots that are printed in a plurality of printing scans.

However, in the method disclosed in Japanese Patent Laid-Open No. 2000-103088 it is not possible to control the overlap amount of dots that are printed in a plurality of printing scans. As a result, the number of overlapping dots may become excessive and the graininess of the image may be increased, or conversely, the number of overlapping dots could be too few and the aforementioned density fluctuation may not be sufficiently suppressed.

The inventors of the present application placing attention on making it possible to control the amount of the dot overlap by generating data that is reflected in all the quantized data of the different printing scans in common with each other.

On the other hand, the fluctuation in the conveyance amount of the printing medium, which causes the density unevenness mentioned above, differs according to the position of the printing medium on the conveying path of the printing medium. For example, when printing over the entire surface of a printing medium without setting margins, or in other words, performing so-called margin-less printing, the printing position is located on the printing medium where printing is performed by the printing head as the printing medium is conveyed along the conveying path by only one pair of conveying rollers that are provided on both the upstream side and downstream side of the printing area. In such a printing position, the conveyance precision is low and it is easy for fluctuation in the conveyance amount to occur. On the other hand, when the printing medium is conveyed in a state of being held by both of a pair of conveying rollers on the upstream side and downstream side, the conveyance precision is high and it is difficult for fluctuation of the conveyance amount to occur. Moreover, it is known that during conveyance, when the printing medium enters or leaves the nip portion of a pair of conveying rollers, there is a relatively large fluctuation in the conveyance amount.

When there is various fluctuation in the amount of conveyance such as this, applying a process of generating data that is commonly reflected in all of the data may perform the processing described above for generating data for not so necessary printing positions and thus causes an increase in processing load or decrease in processing speed. For example, the process of dividing multi-valued data and quantizing the individual multi-valued data brings about an increase in the processing load.

SUMMARY OF THE INVENTION

The object of the present invention is to provide an image processing apparatus and image processing method capable of suppressing density fluctuation as mentioned above and keeping graininess low, as well as keeping a good balance of the processing load.

In a first aspect of the present invention, there is provided an image processing apparatus that, for printing an image on a pixel area of a printing medium at respective printing positions on the printing medium by performing a plurality of relative scans of a printing head with respect to the printing medium that is conveyed to differentiate the printing positions, processes multi-valued image data that corresponds to the image to be printed on the pixel area, the apparatus comprising: a selecting unit configured to select one of a first process and a second process that process the multi-valued image data corresponding to the printing position in accordance with the printing position on the printing medium; in the case that the selecting unit selects the first process, a first division unit configured to divide the multi-valued image data into respective multi-valued data that correspond to the plurality of relative scans and multi-valued data that corresponds commonly to at least two relative scans among the plurality of relative scans; a first quantization unit configured to perform quantization processing for each of the multi-valued data divided by the first division unit to generate respective quantized data that correspond to each of the plurality of relative scans and quantized data that corresponds commonly to the at least two relative scans; and a combination unit configured to combine the quantized data generated by the first quantization unit for each corresponding relative scan to generate combined quantized data that corresponds to each of the at least two relative scans; or in the case that the selecting unit selects the second process, a second quantization unit configured to perform quantization processing for the multi-valued image data to generate quantized data; and a second division unit configured to divide the quantized data generated by the second quantization unit into respective quantized data that correspond to each of the plurality of relative scans.

In a second aspect of the present invention, there is provided an image processing method of, for printing an image on a pixel area of a printing medium at respective printing positions on the printing medium by performing a plurality of relative scans of a printing head with respect to the printing medium that is conveyed to differentiate the printing positions, processing multi-valued image data that corresponds to the image to be printed on the pixel area, the method comprising: a detection step of detecting the printing position on the printing medium; and a selecting step of selecting one of a first process and a second process that process the multi-valued image data corresponding to the printing position in accordance with the printing position detected by the detection step, wherein the first process including: a first division step of dividing the multi-valued image data into respective multi-valued data that correspond to the plurality of relative scans and multi-valued data that corresponds commonly to at least two relative scans among the plurality of relative scans; a first quantization step of performing quantization processing for each of the multi-valued data divided by the first division unit to generate respective quantized data that correspond to each of the plurality of relative scans and quantized data that corresponds commonly to the at least two relative scans among the plurality of relative scans; and a combination step of combining the quantized data generated by the first quantization unit for each corresponding relative scan to generate combined quantized data that corresponds to each of the at least two relative scans; and the second process including: a second quantization step of performing quantization processing for the multi-valued image data to generate quantized data; and a second division step of dividing the quantized data generated by the second quantization unit into respective quantized data that correspond to each of the plurality of relative scans.

With the structure described above, multi-value image data of an image that corresponds to a printing position on a conveyed printing medium is divided at division ratios according to that printing position. Thereby, when printing at a printing position having low conveyance precision, it is possible to control the amount of dot overlap by performing a process of dividing that multi-value image data in which division ratios are adequately determined and then quantizing the divided data. On the other hand, for example, when the printing position is such that there is no need dividing the multi-value image data and then quantizing that divided data is not necessary, it is possible to make the division ratios zero. As a result, it is possible to balance suppressing density fluctuation with keeping graininess low and the processing load.

Further features of the present invention will become apparent from the following description of exemplary embodiments (with reference to the attached drawings).

BRIEF DESCRIPTION OF THE DRAWINGS

FIGS. 7A to 7C are diagrams expressing an error-distribution matrix that illustrates error-distribution coefficients for peripheral pixels when performing an error diffusion process;

DESCRIPTION OF THE EMBODIMENTS

Embodiments of the present invention will be described in detail below with reference to the drawings. The embodiments explained below relate to an inkjet printing apparatus as an example. However, the present invention is not limited to an inkjet printing apparatus. As long as the apparatus uses a method of printing an image on a printing medium by a printing unit during relative scan between a printing head for printing dots, and the printing medium, the invention can also be applied to the apparatus other than an inkjet printing apparatus.

Figure 2:
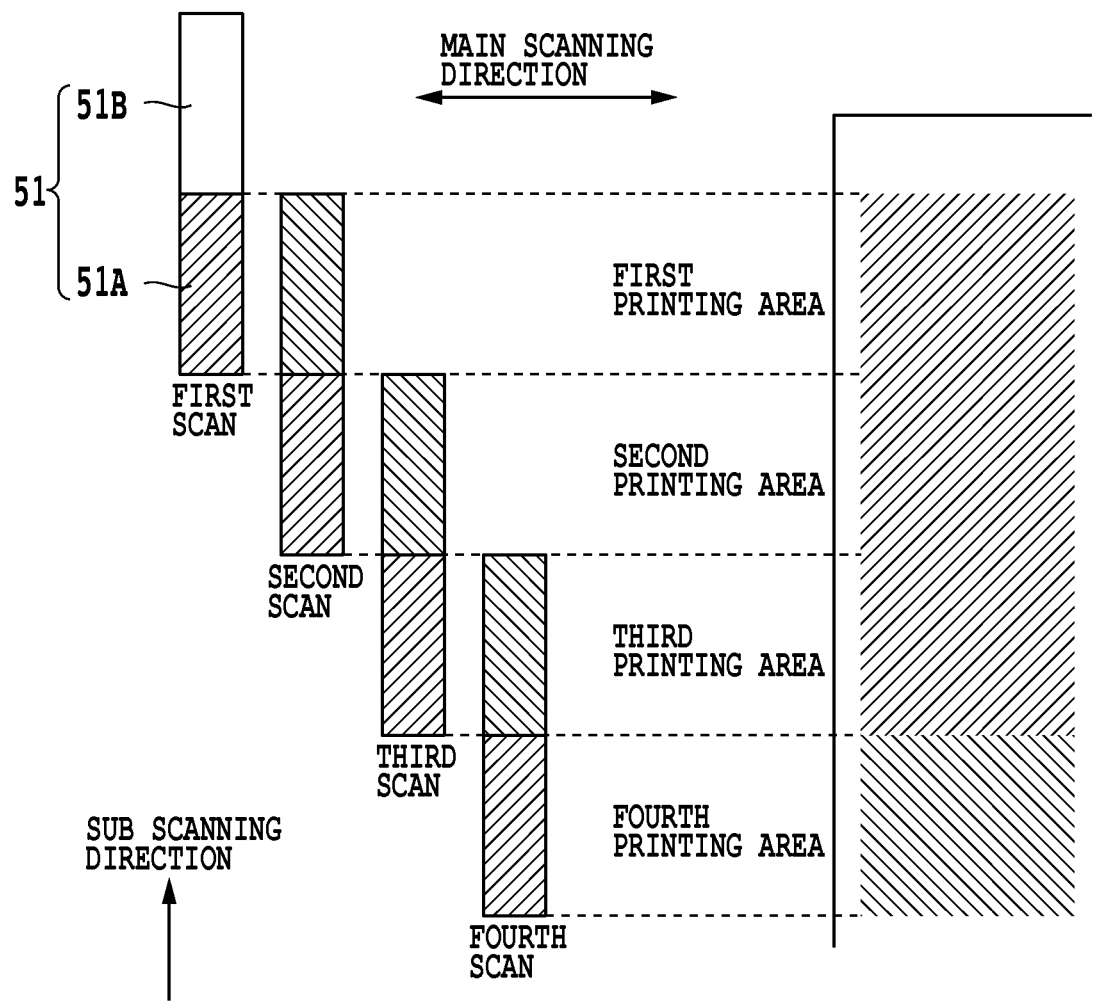
FIG. 2 is a diagram explaining two-pass multi-pass printing.

In this specification, "multi-pass printing" refers to a printing method in which an image to be printed in the same area of a printing medium is completed by a plurality of relative scans (relative movement) between a printing head and printing medium. "Relative scan (relative movement) between a printing head and printing medium" refers to an operation of a printing head moving (scanning) relative to a printing medium, or a printing medium moving (being conveyed) relative to a printing head. On a micro level, the term "same area" refers to "one pixel area", and on a macro level refers to an "area that can be printed during one relative scan". A "pixel area (may simply be called a "pixel")" refers to the smallest unit of area for which gradation expression is possible using multi-valued image data. On the other hand, an "area that can be printed during one relative scan" refers to an area on a printing medium over which a printing head passes during one relative scan, or is an area that is smaller than this area (for example, one raster area). For example, in a serial printing apparatus, when an M-pass (M is an integer 2 or greater) multi-pass mode is executed as illustrated in FIG. 2, on a macro level the same area can be defined as one printing area in the figure (an area having a nozzle array width of 1/M).

Hereinafter, the "relative scan" will be simply referred to as a "scan". For example, in the case of three-pass multi-pass printing, relative scan is performed three times (first relative scan, second relative scan, third relative scan) for one pixel area, and these first through third relative scan are called a "first scan", "second scan" and "third scan", respectively.

<Printing Apparatus Construction>

Figure 1A:
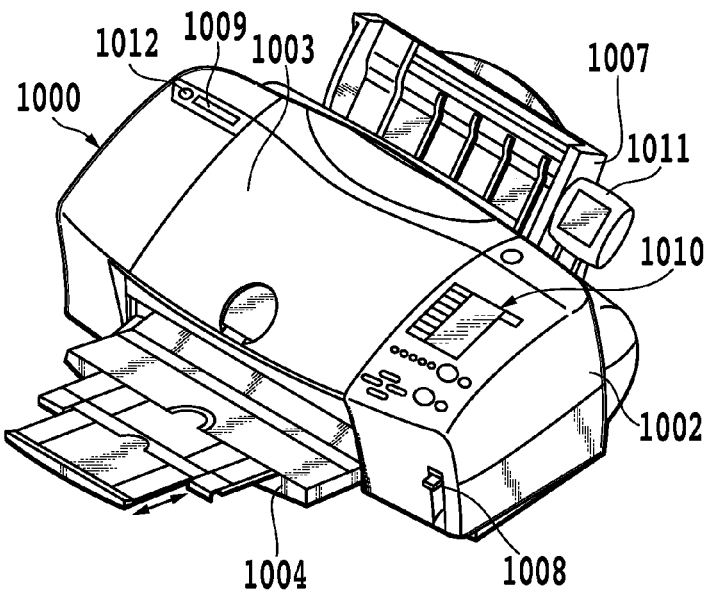
FIGS. 1A to 1C are views explaining the construction of a printer that functions as the image processing apparatus of the present invention.

FIG. 1A is a perspective view of a photo-direct printer (hereafter referred to as a PD printer) 1000 that can be applied as the image processing apparatus of the present invention. The PD printer 1000 has a function for receiving data from a host computer (PC) to perform printing, a function of directly reading an image that is stored on a memory medium such as a memory card to perform printing, and a function of receiving an image from a digital camera, PDA or the like to perform printing.

In FIG. 1A, reference numeral 1004 denotes a discharge tray on which printed paper can be stacked, and reference numeral 1003 denotes an access cover that the user can open or close when replacing the printing head cartridge or ink tank that are housed inside the main unit. Menu items for setting various printing conditions (for example, type of printing medium, image quality, etc.) are displayed on a operation panel 1010 that is provided on the upper case 1002, and the user can set these items according to the type and usage of the image to be output. Reference numeral 1007 denotes an auto feeding unit that automatically feeds printing medium to the inside of the printer, reference numeral 1009 denotes a card slot into which an adapter, in which a memory card can be mounted, is inserted, and reference numeral 1012 denotes a USB terminal for connecting a digital camera. A USB connector for connecting a PC is provided on the rear surface of the PD printer 1000.

Figure 1B:
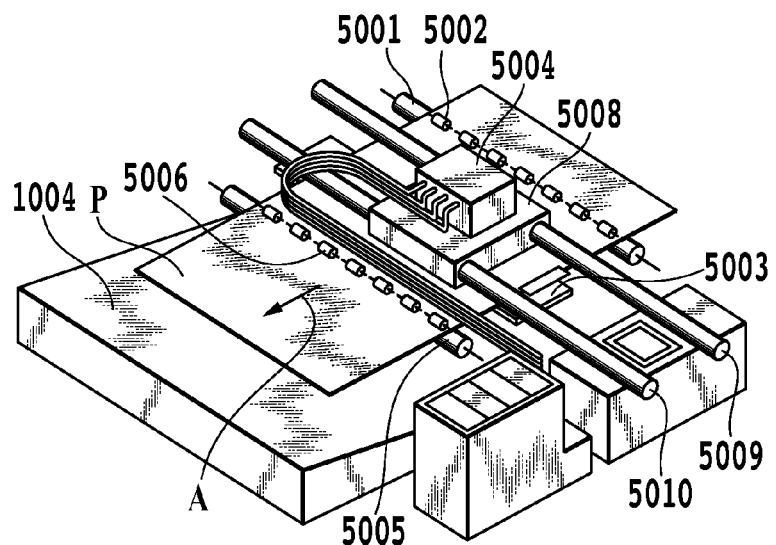

FIG. 1B is a perspective view illustrating the internal construction of the PD printer. A printing medium P is fed by the auto feeding unit 1007 to the nip portion between the conveying roller 5001 that is located on the conveying path, and a pinch roller 5002 that follows the conveying roller. After that, the printing medium P is conveyed by the rotation of the conveying roller 5001 in the direction of arrow A (sub scanning direction) in the figure while being guided and supported on a platen 5003. The pinch roller 5002 elastically presses toward the conveying roller 5001 by a pressure unit such as a spring (not shown in the figure). The conveying roller 5001 and pinch roller 5002 are component elements of a first conveying unit that is located on the upstream side in the conveyance direction of the printing medium.

The platen 5003 is located at the printing position and is opposed to a surface of the inkjet type printing head 5004 where the ejection ports are formed, and by supporting the rear surface of the printing medium P, maintains a constant distance between a front surface of the printing medium P and the ejection port surface. The printing medium P that is conveyed and printed over the platen 5003 is conveyed in the direction A with being held between a discharge roller 5005 and spurs 5006, which are rotating bodies that follow the discharge roller 5005, and is discharged into the discharge tray 1004 from the platen 5003. The discharge roller 5005 and spurs 5006 are component elements of a second conveying unit that is located on the downstream side in the conveying direction of the printing medium.

As described above, as construction for conveying the printing medium inside the printer of the embodiments, a pair of a conveying roller 5001 and a pinch roller 5002 are provided on the upstream side of the printing head, and a pair of a discharge roller 5005 and spurs 5006 are provided on the downstream side.

The printing head 5004 is mounted on a carriage 5008 such that it is removable, and such that the ejection port surface faces the platen 5003 and printing medium P. The driving force of a carriage motor E0001 moves the carriage 5008 back and forth along two guide rails 5009 and 5010, and during this movement, the printing head 5004 executes the ink ejection operation according to print signals. The direction in which the carriage 5008 moves is a direction that crosses the direction (direction of arrow A) in which the printing medium P is conveyed. Printing is performed on the printing medium P by repeating the main scanning (movement during printing) of the carriage 5008 and printing head 5004 and conveyance (sub scanning) of the printing medium P alternately.

Figure 1C:
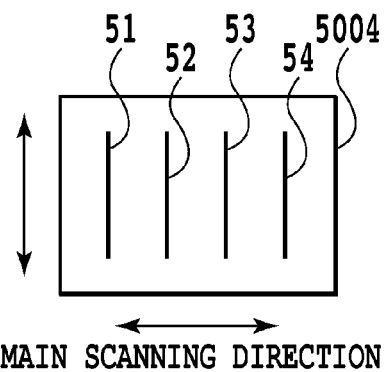

FIG. 1C is a schematic diagram when viewing the printing head 5004 from the surface on which the ejection ports are formed. In the figure, reference numeral 51 denotes a cyan nozzle array, reference numeral 52 denotes a magenta nozzle array, reference numeral 53 denotes a yellow nozzle array and reference numeral 54 denotes a black nozzle array. The width in the sub scanning direction of each of the nozzle arrays is d, and it is possible to perform printing of a width d during one scan.

Each of the nozzle arrays 51 to 54 are constructed such that there are 1200 nozzles arranged in the sub scanning direction at 600 dpi (dots/inch), or in other words at intervals of approximately 42 μm. Each individual nozzle comprises an ejection port, an ink path for guiding the ink to the ejection port, and an electro-thermal conversion element that causes film boiling to occur in the ink near the ejection port. With this construction, by applying a voltage pulse to each individual electro-thermal conversion element according to an ejection signal, film boiling occurs in the ink near the electro-thermal conversion elements, and an amount of ink that corresponds to the growth of generated bubble is ejected from the ejection ports as droplets.

<Multi-Pass Printing>

The printing apparatus of the present embodiment is can perform multi-pass printing, and in this printing, an image is formed step-by-step by a plurality of printing scans to an area in which the printing head 5004 can print in one time of printing scan. An image is formed step-by-step by performing a conveyance operation of a small amount that is less than the width d of the printing head 5004 between successive printing scans and differentiating nozzles used in each step. This allows density unevenness or stripes that occur due to variations in the ejection characteristics of the nozzles to be reduced. Whether or not to perform multi-pass printing, or the number of multi-passes (number of printing scans performed for the same area) is suitably set according to image information that is input from the operation panel 1010 by the user, or that is received from a host device.

Next, FIG. 2 will be used to explain an example of multi-pass printing that can be executed by the printing apparatus described above. Here, two-pass printing will be explained as an example of multi-pass printing; however, the present invention is not limited to two-pass printing, and the multi-pass printing may also be M (M is an integer 2 or greater)-pass printing such as three-pass, four-pass, eight-pass, sixteen-pass printing and the like. In the present invention, the "M-pass mode (M is an integer 2 or greater)" that can be preferably applied is a mode in which printing is performed in the same area of a printing medium by M scans of a printing element group between which the conveyance of the printing medium having a smaller amount than the width of the array range of printing elements intervenes. In the M-pass mode, the amount of one conveyance of the printing medium is preferably set to be equal to an amount corresponding to 1/M the width of the array range of the printing elements, and by performing this setting, the width in the conveyance direction of the same area is equal to a width that corresponds to the amount of one conveyance of the printing medium.

FIG. 2 is a diagram schematically illustrating the state of two-pass printing, and showing the relative positional relationship between the printing head 5004 and printing area in the case of printing in a first printing area to fourth printing area, which correspond to four same areas. In FIG. 2, only one nozzle array (printing element group) 51 of one color of the printing head 5004 shown in FIG. 1C is shown. In addition, herein after, of a plurality of nozzles (printing elements) composing the nozzle array (printing element group) 51, the nozzle group that is located on the upstream side in the conveyance direction is called an upstream side nozzle group 51A, and the nozzle group that is located on the downstream side in the conveyance direction is called a downstream side nozzle group 51B. Moreover, the width in the sub scanning direction (conveying direction) of each of the same areas (each printing area) is equal to the width (640 nozzle widths) that corresponds approximately to half of the width (1280 nozzle widths) of the array range of the plurality of printing elements of the printing head.

In the first scan, only part of the image to be printed in the first printing area is printed using the upstream side nozzle group 51A. The gradation value of the image data that are printed by this upstream side nozzle group 51A is reduced to approximately half of the gradation value of original image data (multi-valued image data that corresponds to the image to be finally printed in the first printing area), for each individual pixel. After the above described printing by the first scan is complete, the printing medium is conveyed along the Y direction by just the distance corresponding to 640 nozzles.

Next, in a second scan, only part of the image that is to be printed in a second printing area is printed using the upstream side nozzle group 51A, and the image to be printed in the first printing area is completed using the downstream side nozzle group 51B. For the image data that is printed by this downstream side nozzle group 51B as well, the gradation value is reduced to approximately half of the gradation value of the original image data (multi-valued image data that corresponds to the image to be finally printed in the first printing area). This allows the image data whose gradation value has been reduced to approximately ½ to be printed two times in the first printing area, and therefore the gradation value of the original image data is conserved. After the above described printing by the second scan is completed the printing medium is conveyed in the Y direction just a distance equal to the amount of 640 nozzles.

Next, in a third scan, only part of the image that is to be printed in the third printing area is printed using the upstream side nozzle group 51A, and the image to be printed in the second printing area is completed using the downstream side nozzle group 51B. After that, the printing medium is conveyed in the Y direction just a distance corresponding to the amount of 640 nozzles. Finally, in a fourth scan, only part of the image that is to be printed in the fourth printing area is printed using the upstream side nozzle group 51A, and the image to be printed in the third printing area is completed using the downstream side nozzle group 51B. After that, the printing medium is conveyed in the Y direction just a distance corresponding to the amount of 640 nozzles. The same printing operation is also performed for other printing areas. By repeating the above described printing main scan and conveyance operation described above, the two-pass printing is performed for all of the printing areas.

<Electrical Specifications of the Control Unit>

Figure 3:
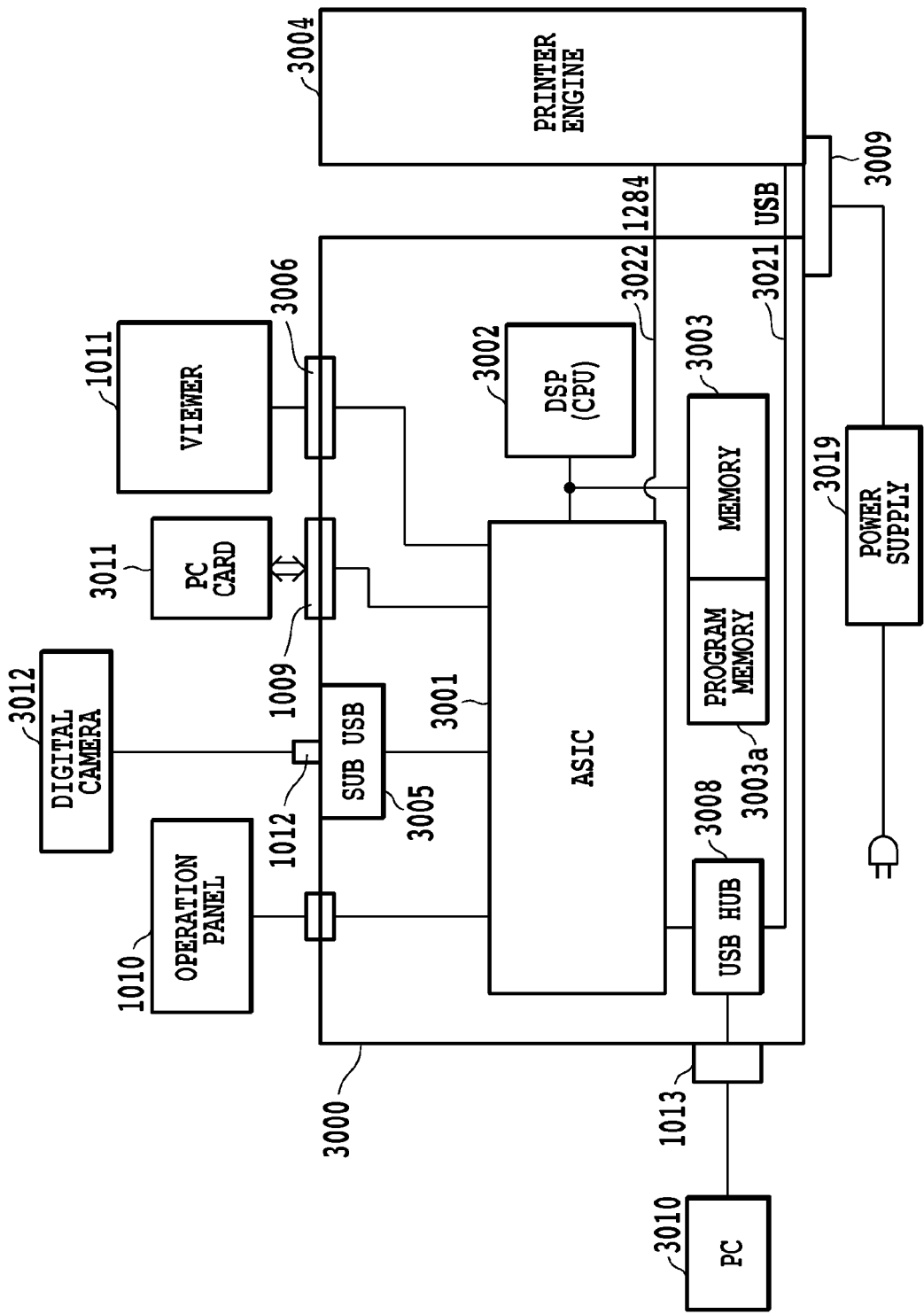
FIG. 3 is a block diagram illustrating the construction of the main part related to control of the printer in FIG. 1.

FIG. 3 is a block diagram illustrating the configuration of the main part related to control of the PD printer 1000 shown in FIG. 1A. In FIG. 3 the same reference numbers are given to parts that are common to those in the aforementioned figures, and an explanation of those parts is omitted. As will be clear from the following explanation, the PD printer 1000 functions as an image processing apparatus.

In FIG. 3, reference numeral 3000 denotes a control unit (control board) and reference numeral 3001 denotes an image processing ASIC (specially customized LSI). Reference numeral 3002 denotes a DSP (digital signal processor), which includes an internal CPU to perform various control processing and image processing shown in FIGS. 5A and 5B and other figures. Reference numeral 3003 denotes a memory and the memory 3003 includes a program memory 3003a that stores the control programs for the CPU of the DSP 3002, a RAM area that stores programs during execution, and a memory area that functions as a work memory the stores image data and the like. Reference numeral 3004 denotes a printer engine, and in this embodiment the printer engine for an inkjet printing apparatus that prints color images using a plurality of colors of color ink is mounted. Reference numeral 3005 denotes a USB connector that is used as a port for connecting a digital camera (DSC) 3012. Reference numeral 3006 denotes a connector for connecting a viewer 1011. Reference numeral 3008 denotes a USB hub (USB HUB), and when the PD printer 1000 performs printing based on image data from the PC 3010, the USB hub passes the data from the PC 3010 as is and outputs that data to the printer engine 3004 via the USB 3021. Thereby, the connected PC 3010 is able to execute printing by directly exchanging data and signals with the printer engine 3004 (functions as a normal PC printer). Reference numeral 3009 denotes a power-supply connector, and by way of the power supply 3019 inputs DC voltage that as been converted from commercial AC. Reference numeral 3010 denotes a typical personal computer, reference numeral 3011 denotes the aforementioned memory card (PC card), and reference numeral 3012 denotes a digital camera (DSC). The exchange of signals between the control unit 3000 and printer engine 3004 is performed by way of the aforementioned USB 3021 or an IEEE 1284 bus 3022.

(First Embodiment)

A first embodiment of the present invention relates to a data generation mode which when dividing multi-valued data to generate multi-valued data for the multi-pass printing of two-pass that is described above referring to FIG. 2, generates divided multi-valued data that is common for two passes as well as divided multi-valued data for each of the two-pass. In addition, the data generation mode of this embodiment reflects the quantized data of the common multi-valued data on quantized data for each pass. Furthermore, the data generation of the present invention selectively performs a process of generating common data by dividing of the multi-valued data or a process of dividing quantized data into each of data for two-pass printing without the dividing of multi-valued data.

Figure 4:
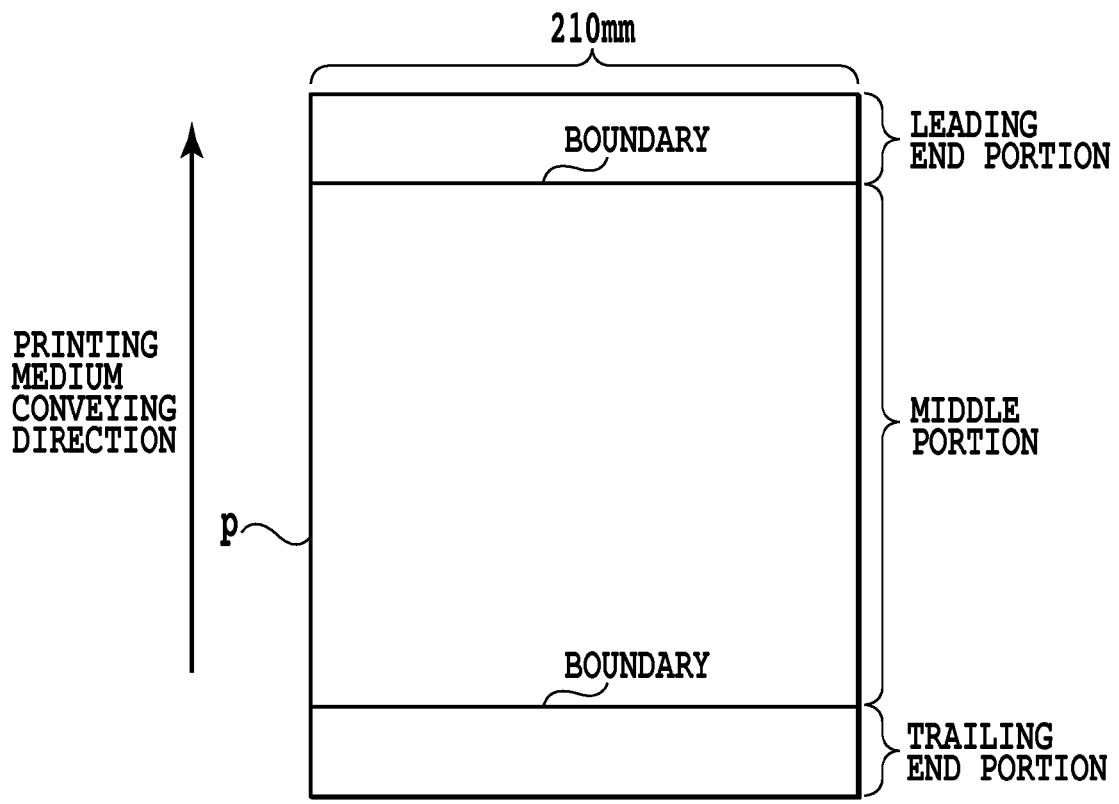
FIG. 4 is a diagram illustrating printing positions on a printing medium when the printing medium is conveyed, in embodiments of the present invention.
Figure 9:
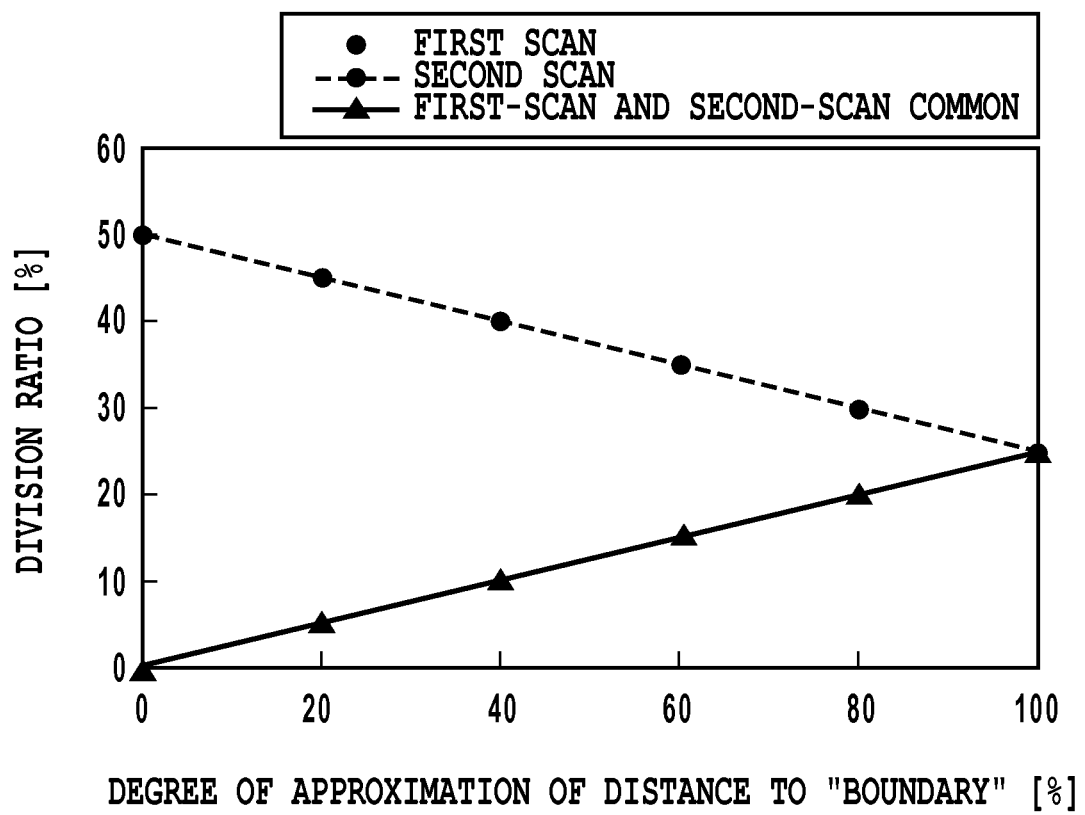
FIG. 9 is a graph showing a relationship between a degree of approximation of a distance to boundary of a leading end portion or a trailing end portion, and division ratios for multi-valued data.

FIG. 9 is a diagram explaining the printing positions on a printing medium when the printing medium is conveyed, according to this embodiment. In FIG. 4, a leading end portion (leading end area) of the printing medium P is the printing position when the printing medium is conveyed in a condition that the printing medium is held between the upstream conveying roller 5001 and pinch roller 5002 (upstream roller pair). Next, a boundary between the leading end portion and a middle portion (middle area) is the printing position when a leading edge of the printing medium is inserted into a nip portion between the downstream discharge roller 5005 and spurs 5006, when the printing medium is conveyed. When the printing medium enters the nip portion, the amount of conveyance may become greater than the normal conveyance amount, and in that case the displacement of the printing position becomes comparatively large.

The middle portion is the printing position when the printing medium is conveyed in a condition that the printing medium is held between both the set of the upstream conveying roller 5001 and pinch roller 5002, and the set of the downstream discharge roller 5005 and spurs 5006.

Furthermore, a boundary between the middle portion and a trailing end portion (trailing end area) is the printing position when the printing medium leaves from the nip portion between the upstream conveying roller 5001 and the pinch roller 5002. When the printing medium leaves from the nip portion as well, as in the case of entering the nip portion as mentioned above, the conveyance amount may suddenly become greater than normal, and in that case the displacement of the printing position becomes comparatively large. Finally, the trailing end portion is the printing position when the printing medium is conveyed in a condition that the printing medium is held only between the downstream discharge roller 5005 and spurs 5006 (downstream roller pair).

The printing positions on the printing medium described above can be known by detecting the position of the printing medium in the conveyance path. In this embodiment, the position of the printing medium is detected according to the amount of rotation of the conveying roller that is measured from the time that a specified sensor that is provided in the conveyance path detects the leading edge of the printing medium. The amount of rotation can be known by a signal from an encoder that is provided on the conveying roller. Even in the case in which the printing medium is conveyed only by the discharge roller, the amount of rotation of the conveying roller that rotates with the discharge roller can be known. In addition, of the printing positions, the "boundary" mentioned above can be determined by the encoder to be the printing position where the amount of rotation becomes a specified amount greater than the amount of rotation during normal rotation. The system explained above for detecting the printing position is used in the generation of quantized data of this embodiment as will be explained next with reference to FIGS. 5A and 5B.

Of course the system for detecting the printing position of the printing medium is not limited to the system described above, and any well-known method could be used.

Figure 5B:
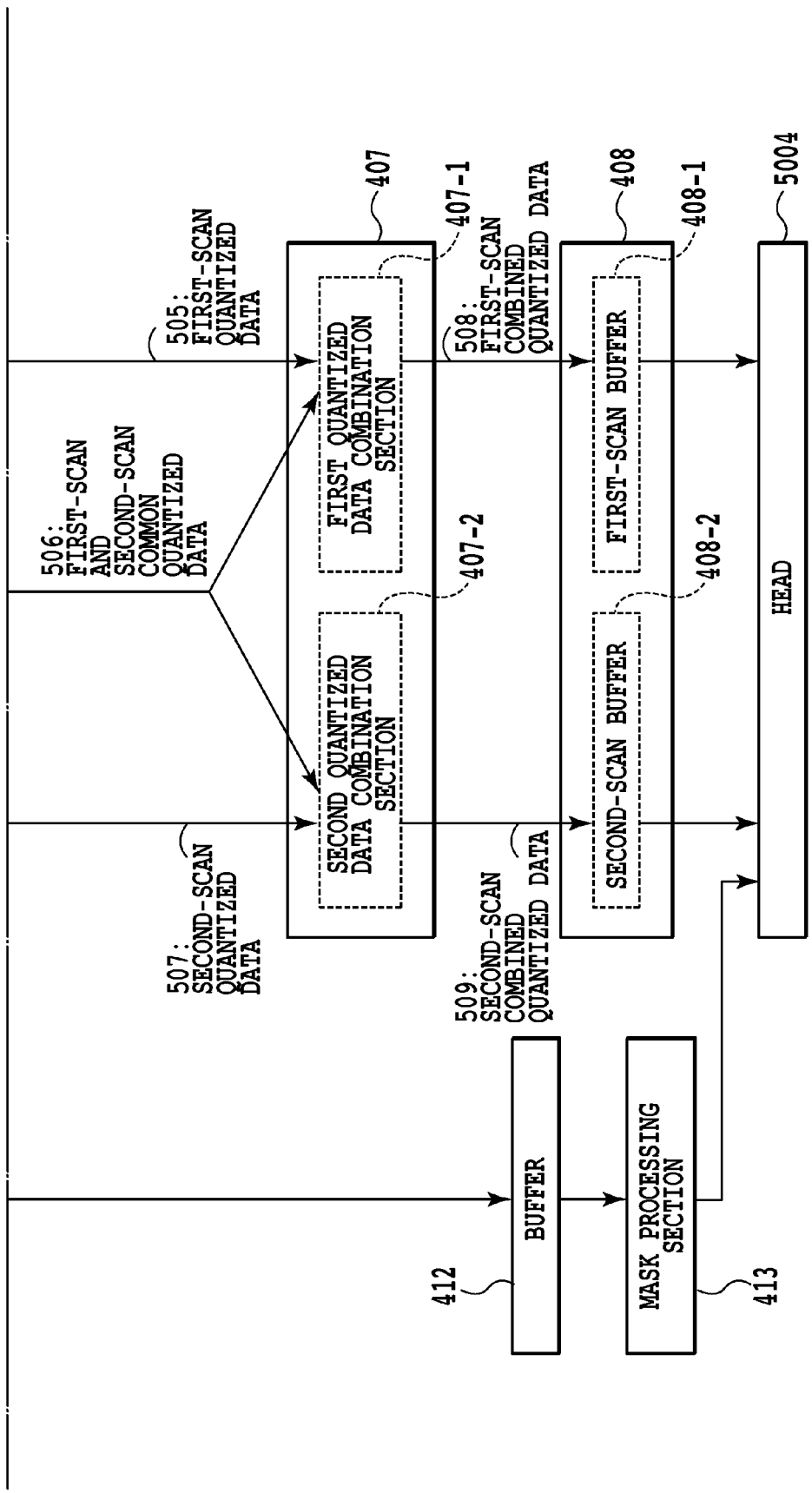
FIG. 5 is a diagram showing a relationship between FIG. 5A and FIG. 5B, and FIGS. 5A and 5B are block diagrams illustrating construction for performing a printing data generation process (image processing) for two-pass printing of a first embodiment of the present invention.

FIGS. 5A and 5B are block diagrams showing a system for performing a process (image processing) for generating printing data for the two-pass printing, according to this embodiment. The multi-valued image data input section 401, color conversion processing section 402, color separation processing section 403, gradation correction processing section 404, a paper plane position detection section 409, division ratio determination section 410, image data division section 405, quantization sections 406, 411, quantized data combination section 407 and print buffers 408, 412, a mask processing section 413 which are shown in FIGS. 5A and 5B, are formed by the control unit 3000 shown in FIG. 3. Among the above sections, the quantization section 406 and 411 correspond to first and second quantization units respectively. A process flow from the input of RGB input image data to the generation of binary data for two passes will be explained below with reference to FIGS. 5A and 5B.

The multi-valued image data input section 401 receives an input of RGB image data that was obtained from an external device such as a digital camera 3012 or PC 3010. The color conversion processing section 402 converts this RGB image data to devise RGB image data that depends on the color reproduction range of the printer. The color separation processing section 403 converts the device RGB image data to multi-valued (in this example, 256 values) image data that corresponds to the ink colors used in the printer. The printer of this embodiment uses the four colors of ink of cyan (C), magenta (M), yellow (Y) and black (K). Therefore, the device RGB image data (R'G'B') is converted to multi-valued data (C1, M1, Y1, K1) that corresponds to C, M, Y and K inks. The color separation processing section 403 uses a three-dimensional look-up-table (LUT) that defines a relation between each of the input values (R'G'B' input values) of the device RGB image data and each of the output values (C1, M1, Y1, K1) of the multi-valued image data that corresponds to the ink colors. Here, input values that are outside the table grid values are calculated by interpolation for output values of the surrounding table grid points.

Next, the gradation correction processing section 404 performs the gradation correction process, and the processing after this gradation correction processing is performed the same for the colors CMYK. Therefore, in the following explanation, data processing will be explained for the color black (K) as a representative. The multi-valued data K1 that is generated by the color separation section 403 is input to the gradation correction processing section 404. The gradation correction processing section 904 performs gradation correction of this multi-valued data K1 and generates gradation corrected multi-valued data K2.

A paper plane position detection section (printing position detection section) 409 detects the printing position on the printing medium as explained in FIG. 4. This embodiment, depending on this detection result, first, in order to generate two-pass printing data, determines whether or not to divide and then quantize the multi-value image data, or to quantize the data without dividing the data, then afterwards divide that quantized data. Hereafter, the former process will be called a first process, and the latter process will be called a second process. Moreover, when dividing data, determination is performed of whether or not to generate common divided data to reflect on the quantized data of each pass according to the detected printing position.

More specifically, when the paper plane position detection section 409 detects that the printing position is the "middle portion", the quantization section 411 quantizes the multi-valued data that is obtained by the gradation correction unit 404 as is. In this embodiment, quantization is binarization from which binary data is obtained. A well-known method such as the error-diffusion method can be used as this quantization method. In addition, the binarized data is temporarily stored in a buffer 421. Then, a mask processing section 413 performs a mask process on the stored binary data, and divides the data into first-scan binary data and second-scan binary data for two-pass printing. Furthermore, the divided binary data is read according to the scanning timing of the printing head 5004.

On the other hand, when the paper plane position detection section 409 detects one of the "boundary section", "leading end portion" or "trailing end portion", the image data division section 405 performs division of the multi-valued data as will be described later. At this division process, the division ratio determination section 410 determines the division ratios according to the printing position of "boundary section", "leading end portion" or "trailing end portion".

More specifically, when the printing position is "boundary", the image data division section 405 performs division at the division ratios 25%, 25% and 25% to generate first-scan multi-valued data, second-scan multi-valued data and first-scan and second-scan common multi-valued data, respectively, in order to complete two-pass printing. In addition, when the printing position is the "leading end portion" or "trailing end portion" that corresponds to a position near a "boundary", the image data division section 905 performs division at the division ratios 50%, 50% and 0% to generate first-scan multi-valued data, second-scan multi-valued data and first-scan and second-scan common multi-valued data, respectively. In other words, when the printing position is the "leading end portion" or "trailing end portion" that corresponds to a position near a "boundary", the common data is not generated. In this case, the quantization section 411 may quantize the multi-valued data obtained by the gradation correction processing section 404, and by mask processing, divide the data into first-scan binary data and second-scan binary data, as in the case of the "middle portion".

In this embodiment, the paper plane position detection process that is performed by the paper plane position detection section 409 is performed after processing by the gradation correction processing section 909. However, the timing for executing the paper plane position detection processing is not limited to this mode. For example, this processing may be performed in parallel with processing for the input multi-value image data, which is processing from multi-value image data input (401) to gradation correction (404).

In the following, the processing by the image data division section 405 and later the processing in the case that the paper plane position detection section 409 detects the printing position on the printing medium as a "boundary", "leading end portion" or "trailing end portion" will be explained in detail.

The image data division section 905 divides the gradation corrected multi-valued data K2 into first-scan multi-valued data 502 that corresponds only to the first scan, second-scan multi-valued data 504 that corresponds only to the second scan, and first-scan and second-scan common multi-valued data 503 that is common to both the first scan and second scan. Then, the first-scan multi-valued data 502, first-scan and second-scan common multi-valued data 503 and second-scan multi-valued data 509 are input to the quantization section 406.

The quantization section 406 performs quantization processing (in this embodiment, binarization processing) for the first-scan multi-valued data 502, first-scan and second-scan common multi-valued data 503 and second-scan multi-valued data 504. Thereby, the first-scan multi-valued data 502 becomes first-scan quantized data 505, first-scan and second-scan common multi-valued data 503 becomes first-scan and second-scan common quantized data 506, and second-scan multi-valued data 504 becomes second-scan quantized data 507.

In this embodiment, binarization processing employing an exclusive error-diffusion method is executed as the quantization processing. Though the exclusive error-diffusion method will be described in detail later, in short it is a process as follows. The error-diffusion processing is performed for the first-scan multi-valued data, the first-scan and second-scan common multi-valued data and the second-scan multi-valued data so that the printing pixels (pixels where dots will be printed) that are set based on the first through third quantized data (first-scan quantized data as the first quantized data, second-scan quantized data as the second quantized data, and first-scan and second-scan common quantized data as the third quantized data) that correspond to three planes become mutually exclusive. That is, the quantization results are controlled so that positions of the printing pixels that are set based on the first-scan quantized data 505, the printing pixel positions that are set based on the first-scan and second-scan common quantized data 506 and the printing pixel positions that are set based on the second-scan quantized data 507 do not overlap each other on the printing medium. Thereby, it is possible to control the amount of printing pixels that are set based on the first-scan and second-scan common quantized data, or in other words, it is possible to control the amount of pixels for which dots will be printed by both the first scan and second scan.

The first-scan quantized data 505, first-scan and second-scan common quantized data 506 and second-scan quantized data 507 that were generated by the quantization section 406 are input to the quantized data combination section 407. More specifically, the first-scan quantized data 505 and first-scan and second-scan common quantized data 506 are input to a first quantized data combination section 407-1, and the second-scan quantized data 507 and first-scan and second-scan common quantized data 506 are input to a second quantized data combination section 407-2. By performing a combination process (in this example, logical sum) for the first-scan quantized data 505 and first-scan and second-scan common quantized data 506, the first quantized data combination section 407-1 generates first-scan combined quantized data 508. On the other hand, by performing a combination process (in this example, logical sum) on the second-scan quantized data 507 and first-scan and second-scan common quantized data 506, the second quantized data combination section 407-2 generates second-scan combined quantized data 509.

The first-scan combined quantized data 508 and second-scan combined quantized data 509 that were generated by the quantized data combination section 407 are transferred to a print buffer 408. Then, the first-scan combined quantized data 508 is stored in a first-scan buffer 408-1, and the second-scan combined quantized data 509 is stored in a second-scan buffer 408-2.

The first-scan combined quantized data that is stored in the first-scan buffer is read when a first scan is performed and transferred to the printing head 5004, and dot printing based on the first-scan combined quantized data is executed during the first scan. Similarly, the second-scan combined quantized data that is stored in the second-scan buffer is read when a second scan is performed and transferred to the printing head 5004, and dot printing based on the second-scan combined quantized data is executed during the second scan. Thereby, printing the image to be printed in the same area can be completed by two scans.

Figure 6:
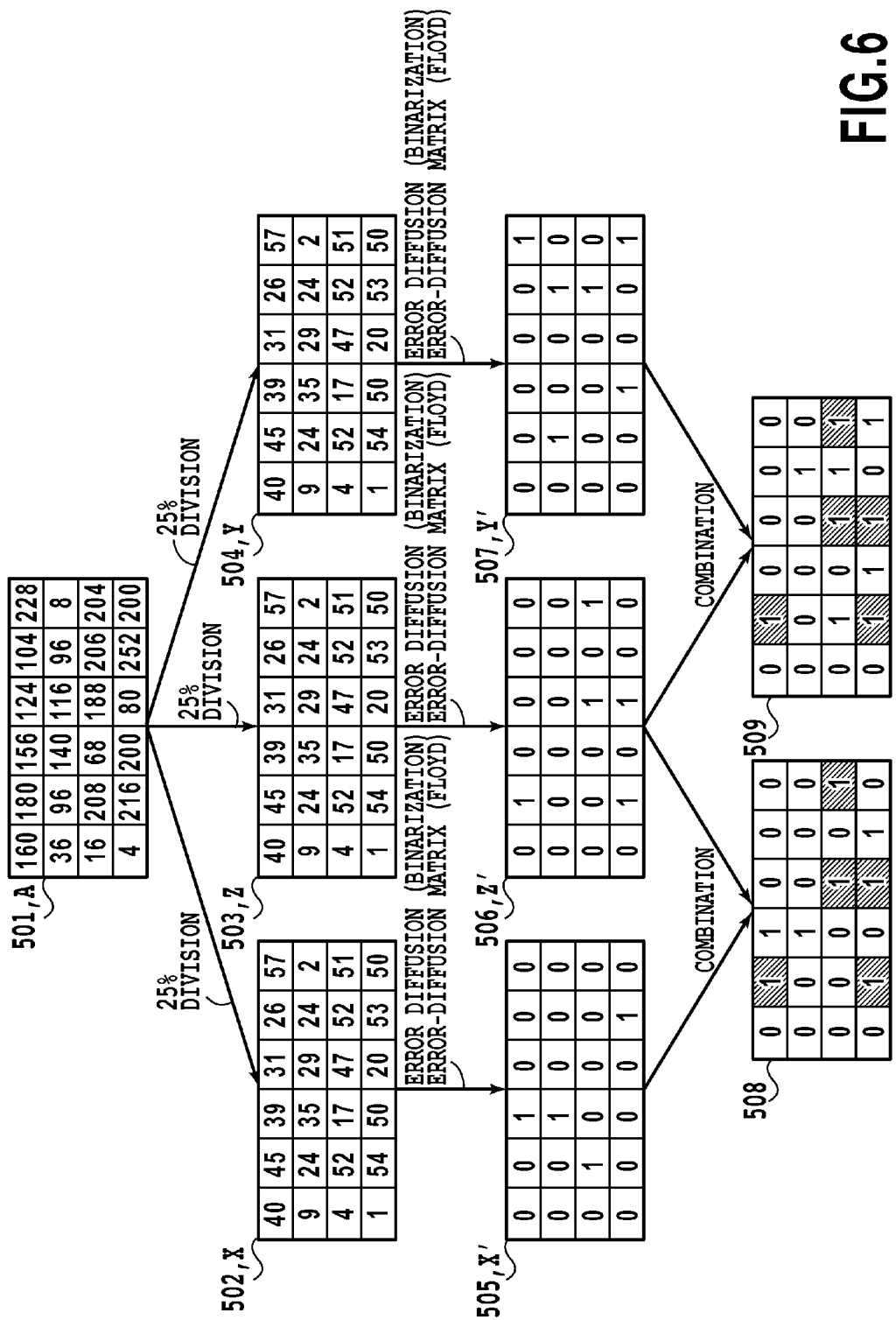
FIG. 6 is a diagram schematically expressing the image processing illustrated in FIGS. 5A and 5B (image data division process→quantization process→quantized data combination process)

Next, the image data division process (405), quantization process (406) and quantized data combination process (407) described above will be explained with reference to FIG. 6. FIG. 6 is a diagram illustrating the change in data values during image processing (image data division process→quantization process→quantized data combination process). Here, the case of processing multi-valued image data 501 that corresponds to a total of 24 pixels, 4 pixels (sub scanning direction)×6 pixels (main scanning direction) will be explained. This multi-valued image data 501 corresponds to multi-valued data K2 of the gradation correction multi-valued data C2, M2, Y2, K2 that is input to the image data division section 405 in FIGS. 5A and 5B.

First, the image data division section 405 divides the multi-valued image data 501 into three divisions for each pixel to generate first-scan multi-valued data 502, second-scan multi-valued data 504 and first-scan and second-scan common multi-valued data 503. In this division, when making the value of the multi-valued image data 501 be A, the value of the first-scan multi-valued data 502 be X, the value of the second-scan multi-valued data 504 be Y and the value of the first-scan and second-scan common multi-valued data 503 be Z, division processing is performed so that $X+Y+2Z=A$ is satisfied and that X and Y are nearly the same value. In order to do this, in this embodiment, division processing is performed so that the XYZ values become approximately ¼ (25%) the value of the multi-valued image data A. More specifically, the quotient α and remainder β (0 to 3) when dividing A by 4 are found, and XYZ values are set based on the quotient α and remainder β as below.

When $\beta=0 \rightarrow X=Y=Z=\alpha$
When $\beta=1 \rightarrow X-1=Y=Z=\alpha$
When $\beta=2 \rightarrow X-1=Y-1=Z=\alpha$
When $\beta=3 \rightarrow X-1=Y=Z-1=\alpha$ The values for X, Y and Z that are set in this way respectively become the value of the first-scan multi-valued data 502, the value of the second-scan multi-valued data 509 and the value of the first-scan and second-scan common multi-valued data 503 shown in FIG. 6, respectively. For example, when the value of multi-valued image data A is "160", α=90 and β=0, so X=Y=Z=α=40. It should be noted that the multi-valued image data 501 is 256-value data, and the value of A is any of values 0 to 255.

Next, the quantization section 406 performs exclusive error-diffusion processing for the first-scan multi-valued data 502, the first-scan and second-scan common multi-valued data 503 and the second-scan multi-valued data 509. The threshold value that is used in the error diffusion processing is "128". In addition, the Floyd error-diffusion matrix shown in FIG. 7A is used as the error-distribution matrix that gives error-distribution coefficients for the peripheral pixels when performing error-diffusion processing. The first-scan quantized data 505 is binary data that is obtained by quantizing the first-scan multi-valued data 502, where a "1" denotes a pixel where a dot is printed, and "0" denotes a pixel where a dot is not printed. Similarly, first-scan and second-scan common quantized data 506 is binary data that is obtained by quantizing the first-scan and second-scan common multi-valued data 503, and second-scan quantized data 507 is binary data that is obtained by quantizing the second-scan multi-valued data 504. As is clear from FIG. 6, the positions of the printing pixels that are defined by these binary quantized data 505 to 507 are such that they do not overlap each other. In this manner, in this embodiment, error-diffusion processing is performed for the multi-valued data 502 to 504 of the three planes so that the positions of the printing pixels that are defined by the binary quantized data 505 to 507 are each exclusive. The exclusive error-diffusion processing will be explained below with reference to FIG. 8.

Figure 8:
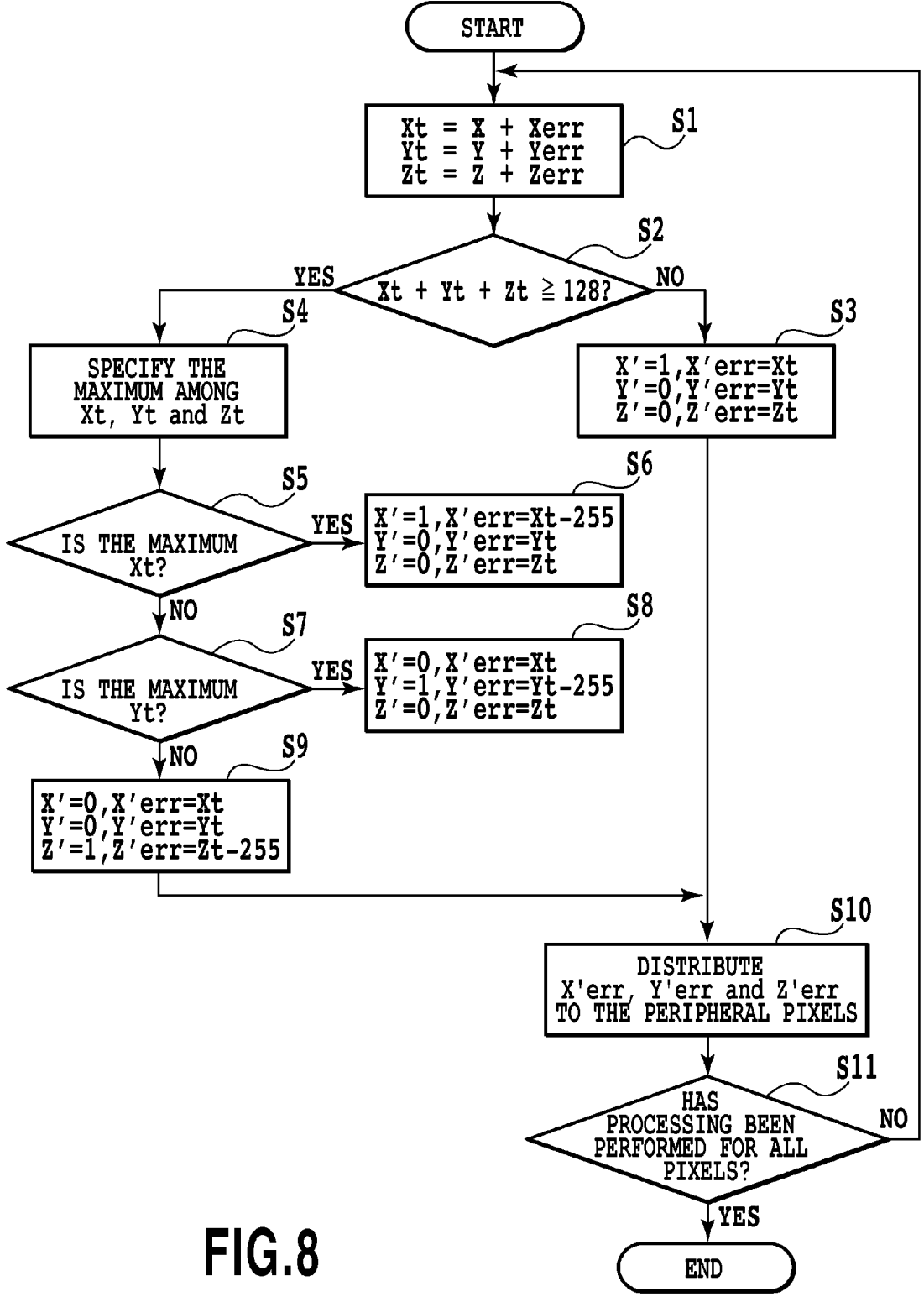
FIG. 8 is a flowchart illustrating the exclusive error-diffusion process for generating binary data in a first embodiment.

FIG. 8 is a flowchart for explaining the exclusive error-diffusion processing. First, the reference symbols in the figure will be explained. The symbols X, Y and Z, as explained above, denote values of multi-valued data (502, 504, 503) for three planes that are input to the quantization section 406 and have a value between 0 and 255. Symbols Xerr, Yerr and Zerr denote accumulated error values that are generated from peripheral pixels for which quantization (binarization) has already been completed. In this example, in order to conserve the errors generated by quantization processing for each plane, the error of the quantization process generated for each plane is distributed to peripheral pixels within the respective plane. Symbols Xt, Yt and Zt denote total values of the multi-valued data values (X, Y, Z) and the accumulated error values (Xerr, Yerr, Zerr). Symbols X', Y' and Z' denote the values of quantized data (505, 507, 506) which are the results of quantization processing (binarization). Symbols X'err, Y'err and Z'err denote error values that occur in the quantization for an object pixel.

When this processing begins, first, in step S1, the values Xt, Yt and Zt are calculated for the object pixel. Then, in step S2, the values Xt, Yt and Zt are added to each other and it is determined whether or not the added value (Xt+Yt+Zt) is equal to or greater than the threshold value (128). When the added value is determined to be less than the threshold value, processing advances to step S3, and in order that no printing is performed for the object pixel by any scan, the binarization results X', Y' and Z' are set to X'=Z'=0. In addition, the errors generated by this binarization process are conserved as X'err=Xt, Y'err=Yt and Z'err=Zt, after which processing advances to step S10.

On the other hand, in step S2, when it is determined that the added value is equal to or greater than the threshold value, processing advances to step S4, and in order to determine the plane for setting the object pixel as a printing pixel, one maximum value parameter is specified among the values Xt, Yt and Zt. However, when there are two or more maximum value parameters, one parameter is specified with the order of priority being the order Zt, Xt and Yt. The order of priority is not limited to this, and Xt or Yt could also be set as being the first priority.

Next, in step S5, it is determined whether or not the parameter specified in step S4 is Xt. When it is determined that the specified parameter is Xt, processing advances to step S6, and in order that the object pixel is printed during only the first scan, the binarization results X', Y' and Z' are set as X'=1, Y'=0 and Z'=0. Moreover, the errors that are generated by this binarization processing are conserved as X'err=Xt−255, Y'err=Yt and Z'err=Zt, after which processing advances to step S10. On the other hand, in step S5, when it is determined that the specified parameter is not Xt, processing advances to step S7, and it is determined whether or not the parameter specified in step S4 is Yt. When it is determined that the specified parameter is Yt, processing advances to step S8, and in order that the object pixel is printed in only the second scan, the binarization results X', y' and Z' are set to X'=0, Y'=1 and Z'=0. Moreover, the errors generated by this binarization processing are conserved as X'err=Xt, Y'err=Yt−255 and Z'err=Zt, after which processing advances to step S10. In step S7, when it is determined that the specified parameter is not Yt, processing advances to step S9, and in order that the object pixel is printed in both the first scan and second scan, the binarization results X', Y' and Z' are set to X'=0, Y'=0 and Z'=1. Moreover, the errors that are generated by this binarization processing are conserved as X'err=Xt, Y'err=Yt and Z'err=Zt−255, after which processing advances to step S10.

In step S10, X'err, Y'err and Z'err that were conserved in step S3, S6, S8 or S9 are distributed to the peripheral pixels in the respective plane according to the error-distribution matrix in FIG. 7A. The quantization processing of the object pixel is completed in this manner, and processing advances to step S11. In step S11, it is determined whether or not quantization processing has been completed for all of the pixels, and when processing has not been completed for all pixels, processing returns to step S1, and the similar processing as described above is performed for the next object pixel. When processing has been completed for all pixels, the exclusive error-diffusion process ends. The accumulated error values (for example, Xerr) that are used in step S1 are accumulated values of the quantization errors (for example, X'err) that are distributed from one or a plurality of pixels in step S10.

Through the exclusive error-diffusion processing described above, quantized data (first-scan quantized data 505 (X'), first-scan and second-scan common quantized data 506 (Z') and second-scan quantized data 507 (Y')) are generated as illustrated in FIG. 6 so that the positions of printing pixels do not overlap each other. In other words, it is possible to control the amount of "1s" (printing dots) in the first-scan and second-scan common quantized data that is generated exclusively from other data, through the division ratio described above. Thereby, as will be described next, it becomes possible to control the amount of overlapping dots that will be printed according to the quantized data for the first scan and second scan that are finally generated by combining the common data.

FIG. 6 will be referenced again. The first quantized data combination section 407-1 combines the first-scan quantized data 505 and first-scan and second-scan common quantized data 506 using a combination process (in this embodiment, logical sum) to generate binary first-scan combined quantized data 508. In this first-scan combined quantized data 508, pixels to which a "1" is attached are pixels that become the object of printing in the first scan, and pixels to which a "0" is attached are pixels that do not become the object of printing in the first scan. Further, pixels denoted by diagonal lines are pixels that become the object of printing in both the first scan and second scan. Similarly, the second quantized data combination section 407-2 combines the second-scan quantized data 507 and first-scan and second-scan common quantized data 506 using a combination process (in this embodiment, logical sum) to generate binary second-scan combined quantized data 509. In this second-scan combined quantized data 509, pixels to which a "1" is attached are pixels that become the object of printing in the second scan, and pixels to which a "0" is attached are pixels that do not become the object of printing in the second scan. In addition, pixels denoted by diagonal lines are pixels that become the object of printing in both the first scan and second scan in common with each other.

With this embodiment, as described above, it is possible to generate pixels for which dots will be printed commonly in a plurality of scans, and therefore it is possible to suppress fluctuation of the dot coverage (image density fluctuation) that is caused by conveyance error of the printing medium, movement error of the carriage or the like. Moreover, by quantizing multi-valued data that corresponds in common with a plurality of scan, it is possible to control the amount of pixels for which dots are printed in each of the plurality of scans (overlapping dots), and thus it is possible to suppress graininess due to an excessive amount of overlapping dots from becoming worse. Thereby, it is possible to keep graininess low level while at the same time suppress density fluctuation in an image.

Furthermore, with this embodiment, the first process, which is a process of dividing the multi-valued data and then performing quantization, or the second process, which is a process of performing quantization without performing division first, and then performing division later, is selected according to the printing position on the printing medium. As a result, for printing positions where it is not so necessary to suppress density fluctuation and keep graininess low, it is possible to not perform processing to divide the multi-valued data, and thus it is possible to suppress an increase in unnecessary processing load.

Figure 13A:
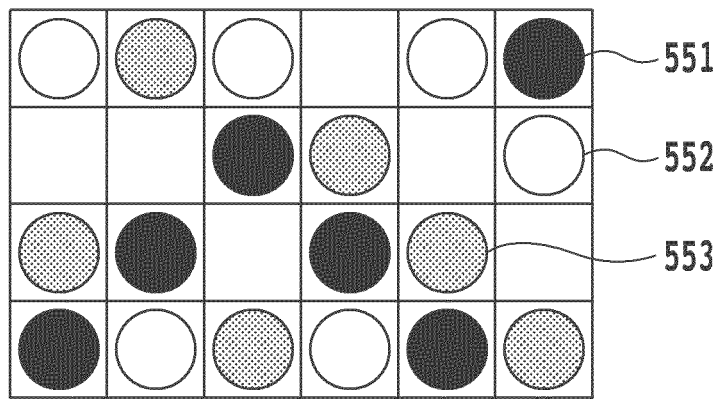
FIGS. 13A and 13B are diagrams illustrating the dot arrangement of dots printed in two scans.
Figure 13B:
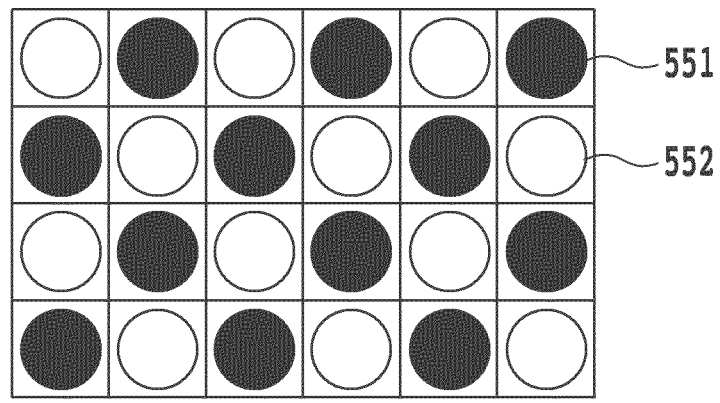

It should be noted that in this embodiment, division processing is performed so that the relationship X+Y+2Z=A is satisfied and such that X, Y and Z are nearly the same value to each other. However, the invention is not limited to this condition. By satisfying the relationship X+Y+2Z=A, the values of the multi-valued data before and after division do not change, and therefore the density conservation of the image is very excellent. However, even though the relationship X+Y+2Z=A is not satisfied, as long as the value of X+Y+2Z is roughly A, it is possible to sufficiently maintain conservation of the image density. In addition, when executing the processing of this embodiment, pixels occur as illustrated in FIG. 13A for which dots are not printed even though the value of the multi-valued image data 501 is a value that indicates the maximum density value (255). In the case of dot arrangement as illustrated in FIG. 13A, the image density becomes low when compared with the dot arrangement of a 100% solid image as illustrated in FIG. 13B. The image density for a dot arrangement as illustrated in FIG. 13A is sufficient. However, when it is desired to express a higher density, it is possible to set the values of X, Y and Z so that the total value X+Y+2Z is a value equal to or greater than A.

(Embodiment 2)

In a second embodiment of the present invention, the division ratios for when the printing position is the "leading end portion" and "trailing end portion" differ from those of the first embodiment. More specifically, the second embodiment of the invention relates to a mode in which the division ratios are made to differ according to the distance between the "leading end portion" or "trailing end portion", which is near the "boundary" described above, and the "boundary".

In this embodiment, the paper plane position detection section 409 illustrated in FIG. 5A detects the printing position according to the distance mentioned above. Then, the division ratio determination section 410, as will be explained below, determines the division ratios corresponding to the aforementioned distance.

FIG. 9 is a graph showing the relationship between the approximation, which is expressed as a ratio of the distance between the position in the conveying direction of the "leading end portion" or "trailing end portion" and the "boundary" with respect to the overall length in the conveying direction of the "leading end portion" or "trailing end portion", and the division ratios.

As shown in FIG. 9, at a position of the approximation 100% where the position is the "boundary", the first-scan multi-valued data, second-scan multi-valued data and first-scan and second-scan common multi-valued data are divided at a percentage of 25% each. On the other hand, at a position the approximation 0% where the position is the edge of the leading end portion or trailing end portion, the first-scan multi-valued data and second-scan multi-valued data are both divided at a percentage of 50% each, and the first-scan and second-scan common multi-valued data is divided at a percentage of 0%. In addition, at a position between an approximation of 100% and 0%, division is performed at division ratios that change linearly.

As described above, in the first embodiment, the change in division ratios between the "boundary" and "leading end portion" or "trailing end portion" is comparatively large; however, in this embodiment, the division ratios can be changed gradually in a linear manner. More specifically, in the first embodiment, the common data is used in the "boundary"; however, the common data is not used in the "leading end portion" or "trailing end portion" that are separated from that printing position. In this case, the dot overlap rate changes comparatively sharply between these areas. On the other hand, with this embodiment, it is possible to change the dot overlap ratio gradually.

When the approximation is 0%, the division ratios are not limited to those described above. For example, as explained in the first embodiment, quantization may be performed without dividing the gradation corrected multi-valued data, after which the quantized data can be divided using a mask process.

(Other Embodiments)

Printing positions on a printing medium in the embodiments explained above are separated according to whether or not the printing medium is held by respective conveying roller pairs provided on upstream and downstream sides of the printing head. However, of course application of the present invention is not limited to this form. It may be possible to distinguish printing positions by the construction for conveying printing medium in the printer. That is, for generating printing data for a printing position in a conveyance condition in which comparatively large conveyance error occurs during conveyance of the printing medium, it is possible to select a process as described above according to the occurring conveyance error such as selecting the process described above in which the multi-valued data is divided and then quantized.

(Further Embodiments)

In each of the embodiments described above, when dividing multi-valued data, error-diffusions are performed exclusively for three multi-valued data. However, the error-diffusion does not have to be exclusive. More specifically, error-diffusion processing may be performed for the three multi-valued data using the three types of error-distribution matrices shown in FIGS. 7A to 7C.

To the quantization section 406 shown in FIG. 5A, the first-scan multi-valued data 502, first-scan and second-scan common multi-valued data 503 and second-scan multi-valued data 504 that are generated by the image data division section 405 are input. The quantization section 406 generates first-scan quantized data 505 by performing binary error-diffusion processing for the first-scan multi-valued data 502. In this generation, "128" is used as a threshold value (predetermined value), and the error-distribution matrix shown in FIG. 7B is used as the error-distribution matrix. Moreover, the quantization section 406 generates first-scan and second-scan common quantized data 506 by performing binary error-diffusion processing for the first-scan and second-scan common multi-valued data 503. In this generation, "128" is used as a threshold value, and the error-distribution matrix shown in FIG. 7A is used as the error-distribution matrix. Furthermore, the quantization section 406 generates second-scan quantized data 507 by performing binary error-diffusion processing for the second-scan multi-valued data 509. In this generation, "128" is used as a threshold value, and the error-distribution matrix shown in FIG. 7C is used as the error-distribution matrix.

By using different error-distribution matrices among three planes in this manner, the quantization results for the three planes (positions of printing pixels that are set by the quantized data 505 to 507) can be made different. Thereby, pixels to be printed only by the first scan and pixels to be printed only by the second scan can be generated while pixels (overlapping dots) to be printed by both the first scan and second scan are generated. If the same error-distribution matrix is used among three planes, the quantization results for the three planes are very similar. In that case, the pixels that are printed by the first scan and the pixels that are printed by the second scan are nearly the same, and even when printing an image with the maximum density, of almost all of the printing pixels half are overlapping dots, and for the other half of the pixels, blank pixels where no dots are printed increase. In such a case, it is difficult to conserve the input values in the density of the output image. However, in this embodiment, the quantization results for the three planes differ, and not only the pixels that are printed by both the first scan and second scan, but also the pixels that are printed only in the first scan and the pixels that are printed only in the second scan are generated. Therefore, it is possible to maintain the output image density to a certain extent.

In addition, the respective positions of the printing pixels (pixels to which "1" is assigned) defined by the binary quantized data 505 to 507 that are generated by the processing of this embodiment are not in a perfectly exclusive relationship with each other. Accordingly, there is a possibility that the respective positions of printing pixels will overlap. For example, there may be cases in which the binarization result for a certain pixel is "1" for both the quantized data 505 and quantized data 506. Therefore, by applying a logical sum process as the combination process after that as in the first embodiment, the number of printing pixels after the combination process becomes less than the number of printing pixels that is defined by the quantized data 505 to 507. In that case, the ability to conserve the input values in the density of the output image decreases. When this decrease in the density can be allowed, the logical sum process can be applied as the combination process. However, when such a decrease in density cannot be allowed, a combination process can be executed in which the values of the quantized data ("1" or "0") are added for each pixel, such that the added value becomes the value of the combined quantized data. For example, for a certain pixel A, when the value of both the quantized data 505 and the quantized data 506 is "1", the value of the first-scan combined quantized data 508 is taken to be 2 (=1+1). Then the number of dots that corresponds to the added value (0, 1, 2) is printed in each scan. Thereby, printing can be performed without a decrease in the preservation of the input values in the density of the output image.

With the embodiment described above, as explained in the first embodiment, it is possible to control the amount of pixels (overlapping dots) that are printed in both the first scan and second scan, so that it is possible to suppress both image density fluctuation and a worsening of graininess as described above. In addition, with this embodiment, error-diffusion processing is performed independently for three planes, so when compared with performing exclusive error-diffusion processing as in the first embodiment, it is possible to improve the processing speed.

In this embodiment, in order to make the quantization results for three planes different, the case is explained in which the error-distribution matrices that are used for the planes are different. However, the embodiment is not limited to this. For example, instead of the above configuration, the error-distribution matrices that are used among the planes may be the same, and the threshold values that are used for the planes may be different. Moreover, it is possible to make a combination of error-distribution matrices and threshold values different for the planes.

Furthermore, as another embodiment, instead of the quantization section 406 performing quantization by the error-diffusion method as in the first and second embodiments, it may be possible for the quantization section 406 to perform quantization by using a dither method.

In this case, to the quantization section 406 shown in FIG. 5A, the first-scan multi-valued data 502, first-scan and second scan common multi-valued data 503 and second-scan multi-valued data 504 that are generated by the image data division section 405 are input. The quantization section 406 performs dither processes for the first-scan multi-valued data 502, first-scan and second scan common multi-valued data 503 and second-scan multi-valued data 504 using different dither matrices for each. By performing the dither processes (quantization processes) using three different dither matrices in this manner, it is possible to generate three different quantized data 505 to 507 as the quantization result.

With this embodiment, it is possible to suppress both image density fluctuation and the worsening of graininess while at the same time maintain to a certain extent the conservation of output image density as in the embodiments described above. In addition to this, in this embodiment, the dither process is performed independently for multi-valued data of three planes, and accordingly it is possible to further improve the processing speed. Furthermore, in this embodiment, the dither process is performed using three different dither matrices, and accordingly control of the dot arrangement in each scan and spatial frequency of the overlapping dot arrangement among scans becomes easier than in the case of performing error-diffusion processing.

In the embodiments described above, when dividing the multi-valued data, binarization processing is performed as the quantization processing. However, as yet another embodiment, three-value quantization processing may be performed as the quantization processing. Except for this point the embodiment is the same as the other embodiments described above. In this embodiment, the binarization processing in all of the embodiments described above can be replaced with three-value quantization processing. However, here the case of replacing the binarization processing of the first embodiment with three-value quantization processing will be explained. In this embodiment, three-value exclusive error-diffusion processing is performed on the multi-valued data 502 to 504 so that the positions of printing pixels that are defined by each of the quantized data 505 to 507, which are quantized to three valued data, do not overlap each other.

Figure 10B:
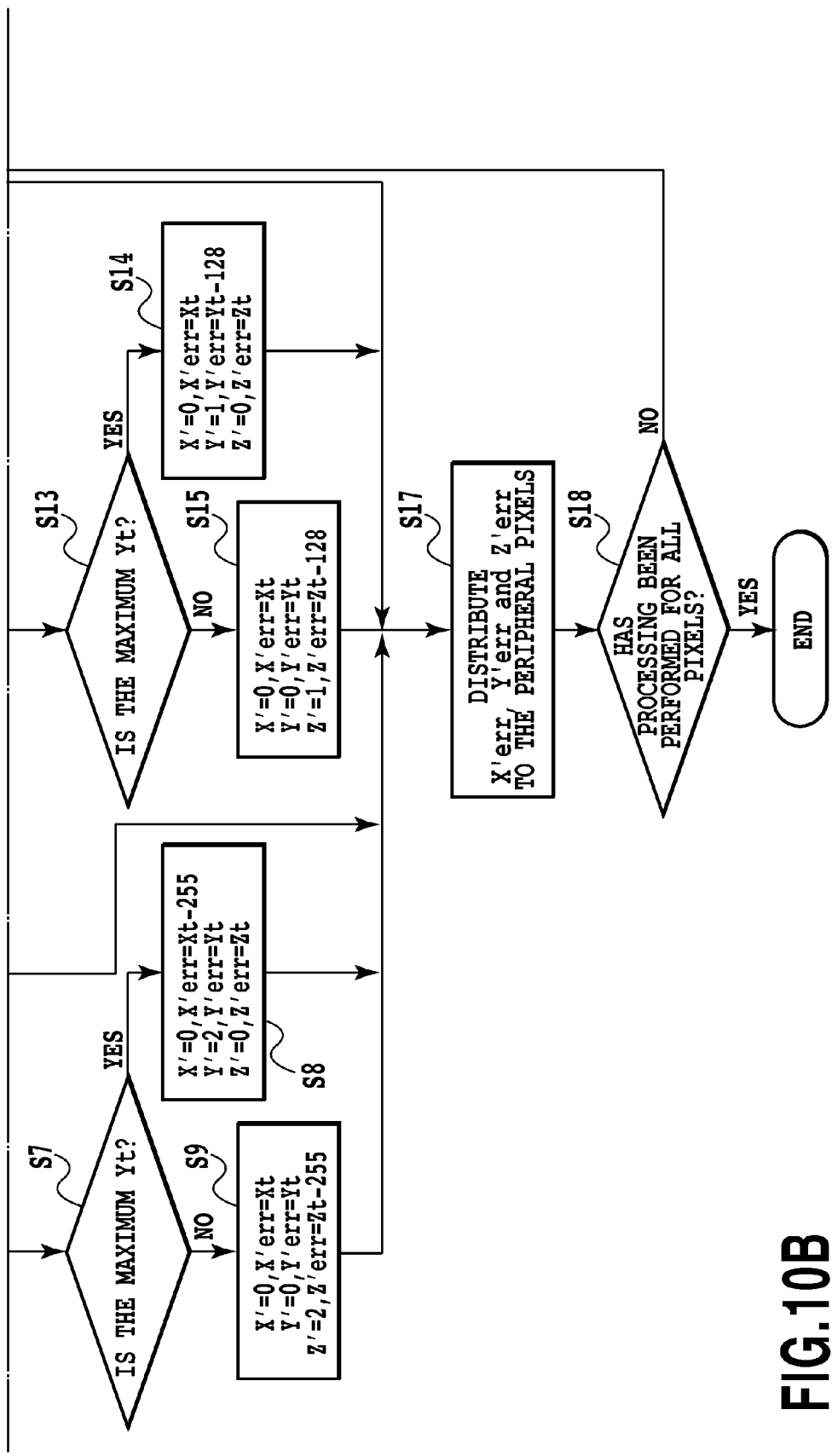
FIG. 10 is a diagram showing a relationship between FIG. 10A and FIG. 10B, and FIGS. 10A and 10B are flowcharts illustrating the exclusive error-diffusion process for generating three-value data in another embodiment of the invention.

FIGS. 10A and 10B are flowcharts for explaining the three-value exclusive error-diffusion processing. The meaning of the symbols (Xt, Xerr, X' and the like) in FIGS. 10A and 10B are the same as the meaning of the symbols in FIG. 8. In this embodiment, as threshold values, a first addition threshold value (170) and a second addition threshold value (85) are used. Moreover, the values of the three-value quantization results X', Y' and Z' are any one of "0", "1" or "2". Here, "0" indicates that no dot is printed, "1" indicates that one dot is printed, and "2" indicates that two dots are printed.

When this processing begins, first in step S1, the values Xt, Yt and Zt are calculated for the object pixel. Next, in step S2, the added value At that is obtained by adding Xt, Yt and Zt (=Xt+Yt+Zt) is obtained. Then in step S3, it is determined whether the added value At is equal to or greater than the first addition threshold value (170), whether the added value At is less than the first addition but equal to or greater than the second addition threshold value (85), and whether the added value At is less than the second addition threshold value.

In step S3, when it is determined that the added value At is less than the second threshold value (85), processing advances to step S16, and in order that the object pixel is not printed in any of the scans, the results of the three-value quantization are set to X'=Y'=Z'=0. Moreover, the errors that are generated by this three-value quantization process are saved as X'err=Xt, Y'err=Yt and Z'err=Zt, and then processing advances to step S17.

On the other hand, in step S3, when the added value At is determined to be equal to or greater than the first addition threshold value (170), processing advances to step S4, and in order to determine the plane for setting the object pixel to a printing pixel ("1"), one of the parameters having the maximum value is identified from Xt, Yt and Zt. However, when there are two or more maximum value parameters, one parameter is identified in the order of priority Zt, Xt and Yt. The order of priority is not limited to this, and Xt or Yt could be the first priority. Next, in step S5, it is determined whether or not the maximum value parameter identified in step S4 is Xt. When the parameter is determined to be Xt, processing advances to step S6, and in order that two dot are printed for the object pixel in the first scan, the three-value quantization results are set as X'=2, Y'=0 and Z'=0. Moreover, the errors that are generated by this three-value quantization process are saved as X'err=Xt−255, Y'err=Yt and Z'err=Zt, after which processing advances to step S17. On the other hand, in step S5, when it is determined that the parameter is not Xt, processing advances to step S7, and it is determined whether or not the maximum value parameter that is identified in step S4 is Yt. When it is determined that the parameter is Yt, processing advances to step S8, and in order that two dots are printed for the object pixel in the second scan, the three-value quantization results are set as X'=0, Y'=2 and Z'=0. Moreover, the errors that are generated in this three-value quantization process are saved as X'err=Xt, Y'err=Yt−255 and Z'err=Zt, after which processing advances to step S17. In step S7, when it is determined that the parameter is not Yt, processing advances to step S9, and in order that two dots are printed for the object pixel in both the first scan and second scan, the binarization results are set as X'=0, Y'=0 and Z'=2. Moreover, the errors that are generated in this binarization process are save as X'err=Xt, Y'err=Yt and Z'err=Zt−255, after which processing advances to step S17.

On the other hand, in step S3, when it is determined that the added value At is less than the first addition threshold value (170) and equal to or greater than the second addition threshold value (85), processing advances to step S10. In step S10, in order to determine the plane for setting the object pixel to the printing pixel ("2"), one maximum value parameter is identified from Xt, Yt and Zt according to the same rules as in step S4. Next, in step S11, it is determined whether or not the maximum value parameter that is identified in step S10 is Xt. When it is determined that the parameter is Xt, processing advances to step S12, and in order that one dot is printed for the object pixel in the first scan, the three-value quantization results are set to X'=1, Y'=0 and Z'=0. Moreover, the errors that are generated by this three-value quantization process are saved as X'err=Xt−128, Y'err=Yt and Z'err=Zt, after which processing advances to step S17. On the other hand, in step S11, when it is determined that the parameter is not Xt, processing advances to step S13 and it is determined whether or not the maximum parameter identified in step S10 is Yt. When it is determined that the parameter is Yt, processing advances to step S14, and in order that one dot is printed for the object pixel in the second scan, the three-value quantization results are set to X'=0, Y'=1 and Z'=0. Moreover, the errors that are generated by this three-value quantization process are saved as X'err=Xt, Y'err=Yt−128 and Z'err=Zt, after which processing advances to step S17. In step S13, when it is determined that the parameter is not Yt, processing advances to step S15, and in order that one dot each is printed for the object pixel in both the first scan and second scan, the binarization results are set to X'=0, Y'=0 and Z'=1. Moreover, the errors that are generated by this binarization processing are saved as X'err=Xt, Y'err=Yt and Z'err=Zt−128, after which processing advances to step S17.

In step S17, the errors X'err, Y'err and Z'err that are saved in step S6, S8, S9, S12, S14, S15 or S16 are distributed to the peripheral pixels of its own plane according to the error-distribution matrix shown in FIG. 7A. In this way, quantization processing of an object pixel end and processing advances to step S18. In step S18, it is determined whether or not quantization processing has ended for all of the pixels, and when processing has not yet ended for all of the pixels, processing returns to step S1 and the similar processing is performed for the next object pixel, and when processing has ended for all of the pixels, the exclusive error-diffusion processing ends. The exclusive error-diffusion processing described above allows quantized data (first-scan quantized data 505 (X'), first-scan and second-scan common quantized data 506 (Y') and second-scan quantized data 507 (Z')) to be generated for three planes, so that the positions of the printing pixels do not overlap each other.

With the embodiment described above, in addition to the effect obtained by the other embodiments, it is possible to obtain an image having even better gradation expression than the embodiments above in which binarization processing is performed. When a plurality of dots are formed in a pixel area, ink may be ejected a plurality of times toward the same position in the pixel area, or ink may be ejected a plurality of times toward different positions in the pixel area.

This embodiment is not limited to the case in which binarization processing that is explained in the first embodiment is replaced with three-value quantization processing, and it is possible to replace the binarization processing of the embodiments that use the three kinds of error-diffusion matrices described above or the embodiments that use the dither method with three-value quantization processing. When binarization is replaced with three-value quantization in this way, it is possible to execute three-value error-diffusion processing or three-value dither as the quantization process. In this case, in order to make the three-value quantization results different among planes, using different error-distribution matrices or different dither matrices for each plane is the same as in the embodiments described above. In this manner, the quantization section 906 generates three-value quantized data 505 to 507 having different quantization results. The positions of the printing pixels that are defined by these three-value quantized data do not have a completely exclusive relationship with each other, and accordingly there may be cases in which the positions of the printing pixels overlap. Therefore, it is preferred that a combination process in which the quantized values are added for each pixel as in the embodiments described above be applied as the following combination process.

In the embodiments described above, two-pass printing in which a image to be printed in the same area is completed by two scans is explained. However, as another embodiment it is possible to apply multi-pass printing of three passes or more. In the following, as an example of multi-pass printing of three passes or more an example of the case of three-pass printing will be explained. Features of this embodiment are an image data division process, quantization process and quantized data combination process, and except for these features, processing is the same as in the embodiments described above. Only the image data division process, quantization process and quantized data combination process will be explained below with reference to FIG. 11.

Figure 11:
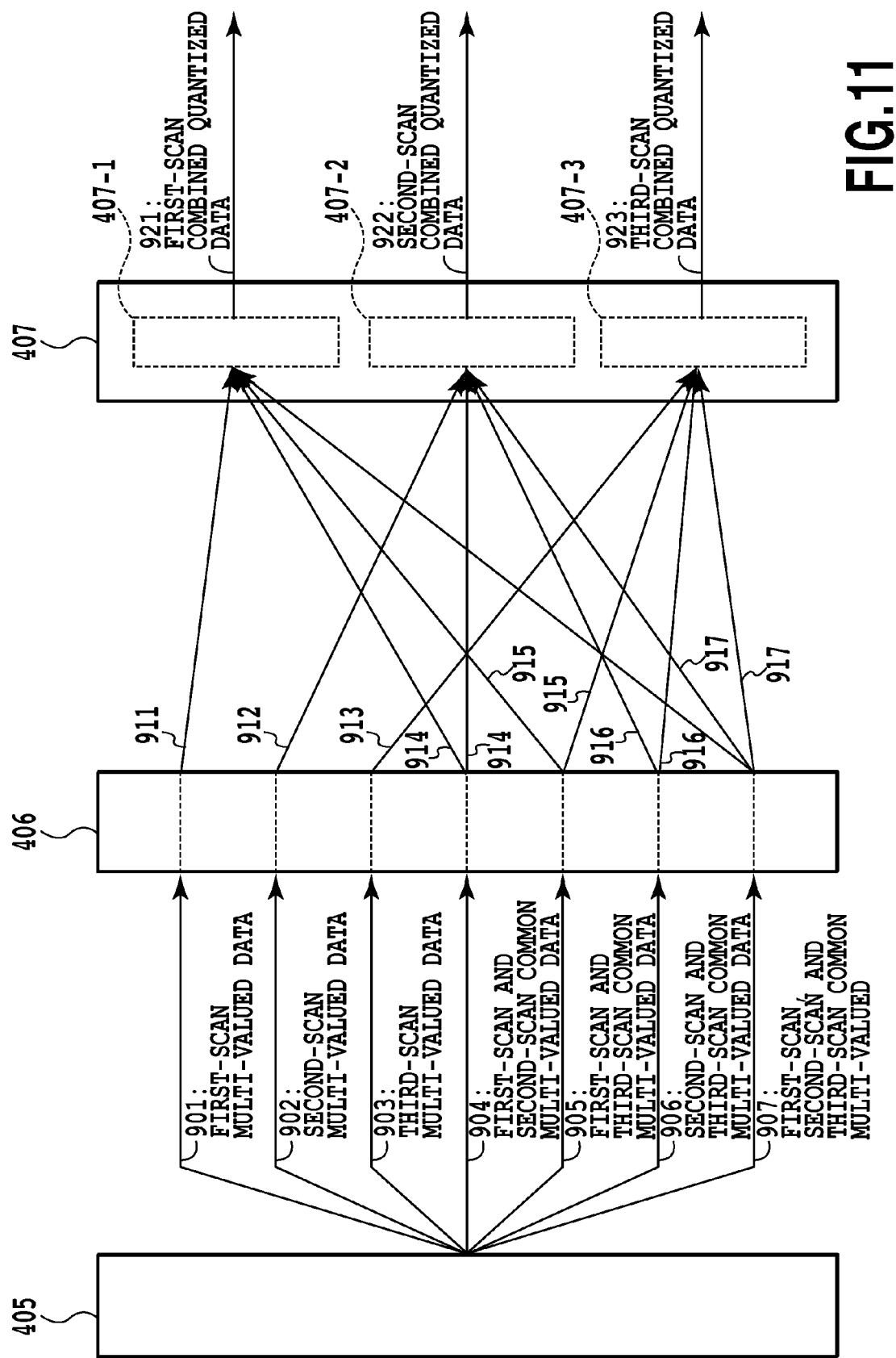
FIG. 11 is a block diagram illustrating construction for performing a printing data generation process (image processing) for performing 3-pass printing.

FIG. 11 is a diagram schematically illustrates the flow of image processing that is executed by the image data division section 405, quantization section 406 and quantized data combination section 407 shown in FIGS. 5A and 5B (image data division process→quantization process→quantized data combination process). As is explained in the first embodiment, gradation corrected multi-valued data K2 (multi-valued image data 501) is input to the image data division section 405.

The image data division section 405 divides the input multi-valued image data into first-scan multi-valued data 901 that corresponds only to the first scan, second-scan multi-valued data 902 that corresponds only to the second scan, third-scan multi-valued data 903 that corresponds only to the third scan, first-scan and second-scan common multi-valued data 904 that corresponds to both the first scan and second scan, first-scan and third-scan common multi-valued data 905 that corresponds to both the first scan and third scan, second-scan and third-scan multi-valued data 906 that corresponds to both the second scan and third scan, and first-scan, second-scan and third-scan common multi-valued data 907 that corresponds to all of the first scan, second scan and third scan.

Next, the quantization section 406 performs binary exclusive error-diffusion as explained for the first embodiment on these seven planes of multi-valued data 901 to 907. Thereby, first-scan quantized data 911, second-scan quantized data 912, third-scan quantized data 913, first-scan and second-scan common quantized data 914, first-scan and third-scan common quantized data 915, second-scan and third-scan common quantized data 916, and first-scan, second-scan and third-scan common quantized data 917 are generated.

Next, these seven planes of quantized data 911 to 917 are input to the quantized data combination section 907 and the quantized data 911 to 917 are combined for each corresponding scan. More specifically, first-scan quantized data 911, first-scan and second-scan common quantized data 914, first-scan and third-scan common quantized data 915 and first-scan, second-scan and third-scan common quantized data 917 are input to a first quantized data combination section 407-1. The first quantized data combination section 407-1 combines the quantized data 911, 914, 915 and 917 (logical sum in this embodiment) and generates first-scan combined quantized data 921. Moreover, second-scan quantized data 912, first-scan and second-scan common quantized data 914, second-scan and third-scan common quantized data 916 and first-scan, second-scan and third-scan common quantized data 917 are input to a second quantized data combination section 407-2. The second quantized data combination section 407-2 combines the quantized data 912, 914, 916 and 917 and generates second-scan combined quantized data 922. Furthermore, third-scan quantized data 913, first-scan and third-scan common quantized data 915, second-scan and third-scan common quantized data 916 and first-scan, second-scan and third-scan common quantized data 917 are input to a third quantized data combination section 407-3. The third quantized data combination section 407-3 combines the quantized data 913, 915, 916 and 917 and generates third-scan combined quantized data 923. By performing the processing described above it is possible to generate printing data for three passes. With this embodiment, the effect obtained in the first embodiment can be achieved in multi-pass printing of three passes or more. In this way quantized data are combined for each relative scan of the printing head over the printing medium.

In this embodiment, exclusive error-diffusion as explained in the first embodiment is applied as the quantization process. However, the quantization process that can be applied to this embodiment is not limited to this method. For example, it may be possible to apply an independent error-diffusion process or independent dither process as explained in the embodiment that use three kinds of error-diffusion matrices or embodiment that uses a dither method. Moreover, the data quantization process that can be applied to this embodiment is not limited to binarization processing, and three-value or four-value or greater quantization processing as was explained in the other embodiment can be applied.

Moreover, in this embodiment, division processing was performed so that common multi-valued data is generated for all combinations of first, second and third scans; however, the division processing that can be applied in this embodiment is not limited to this. For example, it is possible to generate common multi-valued data so that overlapping dots are generated between certain scans (first scan and second scan). In that case, in addition to first-scan multi-valued data 901, second-scan multi-valued data 902 and third-scan multi-valued data 903, it is possible to generate only first-scan and second-scan common multi-valued data 904 as common multi-valued data, and not generate first-scan and third-scan common multi-valued data 905, second-scan and third-scan common multi-valued data 906 or first-scan, second-scan and third-scan common multi-valued data 907.

The technical idea of the present invention is the creation of pixels in which dots are printed in at least two scans, and accordingly, regardless of the number of multi passes, by generating corresponding multi-valued data that is common for at least two scans, it is possible to obtain the effect of the present invention. Therefore, in the present invention, when performing printing by M (M is an integer 2 or greater) scans, in addition to multi-valued data that corresponds to M scans, corresponding multi-valued data that is common for at least two scans may be generated and it is not necessary to generate multi-valued data that is common for all M scans.

Furthermore, forms that are obtained by suitably combining the embodiments described above as another embodiment are included within the range of the present invention.

In the embodiments described above, the case of using a serial-type printer that performs multi-pass printing by ejecting in from a printing head while the printing head moves with respect to a printing medium (relative scan) is explained. However a printing to which the present invention is applied is not limited to this type of printing apparatus. The present invention may be applied to a full-line type printing apparatus that performs multi-pass printing by ejecting ink while a printing medium is conveyed with respect to a printing head (relative scan). For example, a system is possible in which there is one printing head for one ink color, and a plurality of relative scans is performed by moving the printing head back and forth with respect to a printing medium. That is, the present invention may be applied as long as multi-pass printing is performed during relative scan between a printing head and printing medium.

Moreover, examples of binarization or three-value quantization were explained for the embodiments described above. However, the quantization processing that can be applied to the present invention is not limited to this, and 4-value or greater quantization processing can be applied. In other words, in the present invention, N-value (N is an integer 2 or greater) quantization can be applied. Therefore, a form in which the embodiments described above are changed to N-value quantization processing is included in the range of the present invention.

Figure 12:
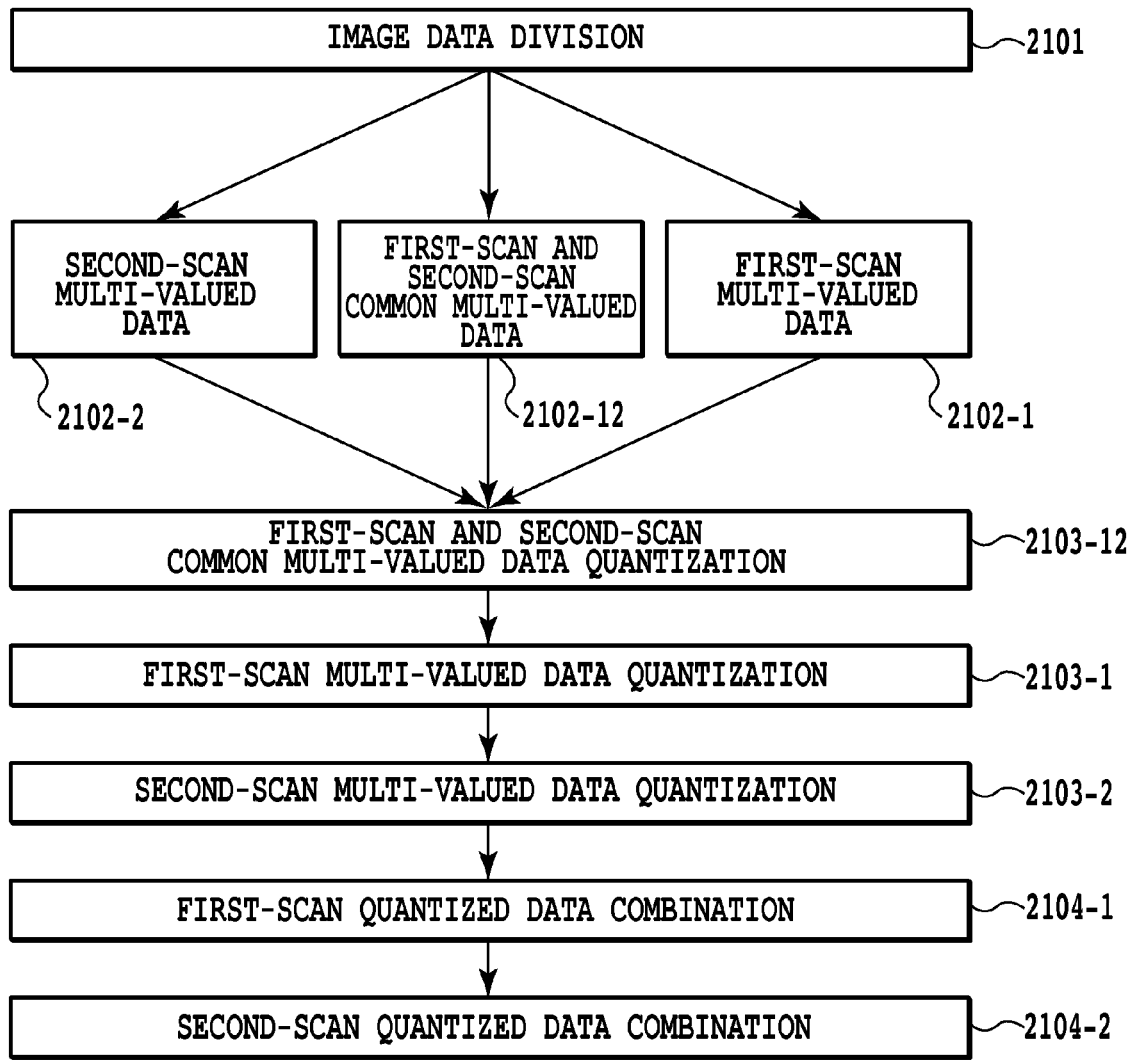
FIG. 12 is a block diagram.

Furthermore, in the embodiments described above, the quantization section 406 performs quantization of a plurality of planes of multi-valued data at the same time (in parallel). However, application of the present invention is not limited to this form, and it is possible to sequentially perform quantization of a plurality of planes of multi-valued data. FIG. 12 is a block diagram that illustrates the steps of this process. In FIG. 12, first-scan and second-scan common multi-valued data quantization (2103-12), first-scan multi-value quantization (2103-1) and second-scan multi-value quantization (2103-2) are in no particular order, and quantization can be performed in any order.

By performing quantization sequentially in this way, it is possible to reduce the amount of memory used during the quantization process when compared with performing quantization simultaneously (in parallel). For example, when performing error-diffusion processing as the quantization process, it is possible to reduce the amount of error storage memory used for storing error values that are generated in the error-diffusion process.

In the embodiments described above, a form in which the four colors of ink CMYK are used was explained. However the number of types of ink that can be used is not limited to this. It is possible to add light cyan (Lc) and light magenta (Lm) ink to the for colors of ink above, and it is also possible to add special inks such as red ink (R) or blue ink (B). In addition, in the embodiments described above, the case was explained in which a color printing mode is executed that uses a plurality of colors of ink; however, the present invention can also be applied to a mono color mode in which only a single color of ink is used. Furthermore, the present invention can be applied to not only a color printer, but also a monochrome printer.

In the embodiments described above, the image processing apparatus that executes the image processing that is a feature of the present invention is explained using an example of a printer (image formation apparatus) that comprises a control unit 3000 having an image processing function; however, the present invention is not limited to this kind of construction. Construction may be such that a host apparatus (for example the PC 3010 in FIG. 3) in which a printer driver is installed executes the image processing that is a feature of the present invention. In that case, the host apparatus that is connected to the printer corresponds to the image processing apparatus of the present invention. It should be noted that when the host apparatus executes the image processing described in the above embodiments, for example, the host apparatus detect a position corresponding to the specified printing position based on input RGB image data or multi-valued image data that is obtained by the color conversion and perform the first process for image data corresponding to the detected position to generate data.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

while the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-287538, filed Dec. 18, 2009, which is hereby incorporated by reference herein in its entirety.

What is claimed is:

1. An image processing apparatus for printing an image on a unit area of a printing medium by performing a plurality of relative scans, which include a first relative scan and a second relative scan, of a printing head with respect to the printing medium that is conveyed in a conveying direction to differentiate a position on the printing medium to which printing is to be performed and processing multi-valued image data for the image to be printed on the unit area, said apparatus comprising:

a first division unit configured to divide the multi-valued image data into at least a first multi-valued data for the first relative scan, a second multi-valued data for the second relative scan, and a third multi-valued data for both of the first and second relative scans;

a first quantization unit configured to perform quantization processing for each of the multi-valued data divided by said first division unit to generate first, second and third quantized data, respectively;

a combination unit configured to combine the first and third quantized data generated by said first quantization unit to generate a first combined quantized data for the first relative scan and to combine the second and third quantized data generated by the first quantization unit to generate a second combined quantized data for the second relative scan;

a second quantization unit configured to perform quantization processing for the multi-valued image data to generate quantized data;

a second division unit configured to divide the quantized data generated by said second quantization unit into respective quantized data for each of the plurality of relative scans; and a selecting unit configured to select one of a first process, which processes the multi-valued image data by the first division unit, the first quantization unit and the combination unit, and a second process, which processes the multi-valued image data by the second quantization unit and the second division unit, in accordance with a position of the unit area on the printing medium in the conveying direction.

2. The image processing apparatus according to claim 1, wherein said selecting unit selects the second process in the case that the position is a position of a middle portion of the printing medium in the conveying direction when the printing medium is conveyed in a condition that the printing medium is held by both an upstream roller pair and a downstream roller pair, the position is a position of a leading end portion of the printing medium in the conveying direction when the printing medium is conveyed in a condition that the printing medium is held only by the upstream roller pair, or the position is a position of a trailing end portion of the printing medium in the conveying direction when the printing medium is conveyed in a condition that the printing medium is held only by the downstream roller pair, and selects the first process in the case that the position is a position of a boundary on the printing medium between the leading end portion and the middle portion in the conveying direction or is a position of a boundary between the trailing end portion and the middle portion in the conveying direction.

3. The image processing apparatus according to claim 1, wherein said selecting unit selects the second process in the case that the printing position is a position of a middle portion when the printing medium is conveyed in a condition that the printing medium is held by both an upstream roller pair and a downstream roller pair, and selects the first process in the case that the printing position is a position of a leading end portion when the printing medium is conveyed in a condition that the printing medium is held only by the upstream roller pair, the printing position is a position of a trailing end portion when the printing medium is conveyed in a condition that the printing medium is held only by the downstream roller pair, or the printing position is a position of a boundary between the leading end portion and the middle portion or is a position of a boundary between the trailing end portion and the middle portion.

4. The image processing apparatus according to claim 3, wherein said first division unit determines division ratios used for dividing the multi-valued image data into respective multi-valued data that correspond to the plurality of relative scans and multi-valued data that corresponds commonly to the at least two relative scans, according to a ratio of a distance between the position in the conveying direction of the leading end portion or trailing end portion and the boundary with respect to the overall length in the conveying direction of the leading end portion or trailing end portion.

5. The image processing apparatus according to claim 1, further comprising:

a printing unit configured to print an image on the printing medium by using the printing head; and a detection unit configured to detect the printing position on the printing medium.

6. A non-transitory computer-readable medium encoded with a program that makes the computer function as an image processing apparatus according to claim 1.

7. The image processing apparatus according to claim 1, wherein the plurality of relative scans further includes a third relative scan, wherein both of the first and third multi-valued data is not for the third relative scan, wherein the first division unit is configured to further divide the multi-valued image data into at least a fourth multi-valued data for both of the first and third relative scans and a fifth multi-valued data for each of the first, second and third relative scans, wherein the first quantization unit is configured to further perform quantization processing for each of the fourth and fifth multi-valued data divided by said first division unit to generate fourth and fifth quantized data respectively, and wherein the combination unit is configured to combine the first, third, fourth and fifth quantized data generated by said first quantization unit to generate a first combined quantized data for the first relative scan.

8. The image processing apparatus according to claim 1, wherein the plurality of relative scans further includes a third relative scan, and wherein each of the first, second and third multi-valued data is for the third relative scan.

9. An image processing method for printing an image on a unit area of a printing medium by performing a plurality of relative scans, which include a first relative scan and a second relative scan, of a printing head with respect to the printing medium that is conveyed in a conveying direction to differentiate a position on the printing medium to which printing is to be performed and processing multi-valued image data for the image to be printed on the unit area, said method comprising:

a first division step of dividing the multi-valued image data into at least a first multi-valued data for the first relative scan, a second multi-valued data for the second relative scan, and a third multi-valued data for both of the first and second relative scans;

a first quantization step of performing quantization processing for each of the first, second and third multi-valued data divided by said first division unit to generate first, second and third quantized data, respectively;

a combination step of combining the first and third quantized data generated by said first quantization unit to generate a first combined quantized data for the first relative scan and combining the second and third quantized data generated by the first quantization unit to generate a second combined quantized data for the second relative scan;

a second quantization step of performing quantization processing for the multi-valued image data to generate quantized data;

a second division step of dividing the quantized data generated by said second quantization unit into respective quantized data for each of the plurality of relative scans; and a selecting step of selecting one of a first process, which processes the multi-valued image data by the first division step, the first quantization step and the combination step, and a second process, which processes the multi-valued image data by the second quantization step and the second division step, in accordance with a position of the unit area on the printing medium in the conveying direction.

10. The image processing method according to claim 9, wherein said selecting step selects the second process in the case that the position is a position of a middle portion of the printing medium in the conveying direction when the printing medium is conveyed in a condition that the printing medium is held by both an upstream roller pair and a downstream roller pair, the position is a position of a leading end portion of the printing medium in the conveying direction when the printing medium is conveyed in a condition that the printing medium is held only by the upstream roller pair, or the position is a position of a trailing end portion of the printing medium in the conveying direction when the printing medium is conveyed in a condition that the printing medium is held only by the downstream roller pair, and selects the first process in the case that the position is a position of a boundary on the printing medium between the leading end portion and the middle portion in the conveying direction or is a position of a boundary between the trailing end portion and the middle portion in the conveying direction.

* * * * *